(12) United States Patent  (10) Patent No.: US 8,989,482 B2
Morifuji et al.  (45) Date of Patent: Mar. 24, 2015

(54) IMAGE PROCESSING APPARATUS, IMAGE PROCESSING METHOD, AND PROGRAM

(75) Inventors: Takafumi Morifuji, Tokyo (JP); Kyoko Fukuda, Kanagawa (JP); Masami Ogata, Kanagawa (JP); Suguru Ushiki, Tokyo (JP)

(73) Assignee: Sony Corporation, Tokyo (JP)

( * ) Notice: Subject to any disclaimer, the term of this patent is extended or adjusted under 35 U.S.C. 154(b) by 379 days.

(21) Appl. No.: 13/486,763

(22) Filed: Jun. 1, 2012

(65) Prior Publication Data

US 2012/0314933 A1 Dec. 13, 2012

(30) Foreign Application Priority Data

Jun. 8, 2011 (JP) ................................. 2011-128101

(51) Int. Cl.
*G06K 9/00* (2006.01)
*G06T 5/00* (2006.01)
*H04N 13/00* (2006.01)

(52) U.S. Cl.
CPC ............ *G06T 5/002* (2013.01); *H04N 13/0022* (2013.01); *H04N 13/0033* (2013.01); *G06T 2207/10028* (2013.01)
USPC .......................................................... 382/154

(58) Field of Classification Search
None
See application file for complete search history.

(56) References Cited

U.S. PATENT DOCUMENTS

| 619,848 | A | * | 2/1899 | Kameyama et al. ............... 42/87 |
| 2010/0266198 | A1 | * | 10/2010 | Kim et al. ...................... 382/154 |
| 2011/0249886 | A1 | * | 10/2011 | Park et al. ...................... 382/154 |
| 2012/0133743 | A1 | * | 5/2012 | Hiramoto et al. ............... 348/46 |
| 2012/0154390 | A1 | * | 6/2012 | Narita et al. .................. 345/419 |

FOREIGN PATENT DOCUMENTS

JP  2011-055022  3/2011
WO  WO 2008102296 A2 *  8/2008

* cited by examiner

*Primary Examiner* — Stephen R Koziol
*Assistant Examiner* — Amandeep Saini
(74) *Attorney, Agent, or Firm* — Sherr & Jiang, PLLC

(57) ABSTRACT

An image processing apparatus includes an attention region estimation unit that estimates an attention region which is estimated as a user paying attention thereto on a stereoscopic image, a parallax detection unit that detects a parallax of the stereoscopic image and generates a parallax map indicating a parallax of each region of the stereoscopic image, a setting unit that sets conversion characteristics for correcting a parallax of the stereoscopic image based on the attention region and the parallax map, and a parallax conversion unit that corrects the parallax map based on the conversion characteristics.

13 Claims, 28 Drawing Sheets

IMAGE PROCESSING APPARATUS, IMAGE PROCESSING METHOD, AND PROGRAM

BACKGROUND

The present disclosure relates to an image processing apparatus, an image processing method, and a program, and more particularly to an image processing apparatus, an image processing method, and a program, which can perform a more appropriate parallax control.

In the related art, a technique has been developed in which a stereoscopic image is displayed using a display device. A sense of depth of a subject reproduced by the stereoscopic image is varied depending on a viewing condition when a user views the stereoscopic image, or a capturing condition of the stereoscopic image. For this reason, depending situations, a subject too protrudes or is too depressed, and thus a sense of depth which is reproduced is unnatural, which causes a user to feel exhausted.

Therefore, there have been many techniques for appropriately controlling a parallax of a displayed stereoscopic image. For example, as such techniques, there has been a technique in which a stress value indicating a stress extent on a user when viewing a stereoscopic image is obtained based on a parallax of each pixel of the stereoscopic image, and the parallax of the stereoscopic image is controlled so as to minimize the stress value (for example, refer to Japanese Unexamined Patent Application Publication No. 2011-055022).

SUMMARY

However, there are cases where a completely appropriate parallax control may not be performed in the above-described technique.

For example, in the technique for performing a parallax control for minimizing a stress value, there are cases where a comfortable sense of depth can be reproduced in the entire screen of the stereoscopic image; however, a depth position of a subject to which a user pays attention on the stereoscopic image may not be appropriate. As such, if the depth position of the main subject to which the user pays attention is inappropriate, the user experiences eye fatigue when viewing the stereoscopic image.

It is desirable to more appropriately perform a parallax control of a stereoscopic image.

According to an embodiment of the present disclosure, there is provided an image processing apparatus including an attention region estimation unit that estimates an attention region which is estimated as a user paying attention thereto on a stereoscopic image; a parallax detection unit that detects a parallax of the stereoscopic image and generates a parallax map indicating a parallax of each region of the stereoscopic image; a setting unit that sets conversion characteristics for correcting a parallax of the stereoscopic image based on the attention region and the parallax map; and a parallax conversion unit that corrects the parallax map based on the conversion characteristics.

The image processing apparatus may further include an image synthesis unit that corrects a parallax of the stereoscopic image based on the corrected parallax map.

The image processing apparatus may further include a maximum and minimum parallax detection unit that detects a maximum value and a minimum value of parallaxes indicated by the parallax map and detects a parallax of the attention region based on the parallax map and the attention region. In this case, the setting unit may set the conversion characteristics based on the maximum value, the minimum value, and the parallax of the attention region.

The setting unit may set the conversion characteristics such that the parallax of the attention region is converted into a parallax with a predetermined size set in advance.

The setting unit may set different conversion characteristics for the attention region on the stereoscopic image and regions other than the attention region on the stereoscopic image.

The setting unit may set the conversion characteristics of the attention region on the stereoscopic image such that a parallax is linearly converted in a predetermined parallax section including the parallax of the attention region.

The image processing apparatus may further include a smoothening unit that smoothens the attention region or the conversion characteristics.

According to another embodiment of the present disclosure, there is provided an image processing method or a program including estimating an attention region which is estimated as a user paying attention thereto on a stereoscopic image; detecting a parallax of the stereoscopic image and generating a parallax map indicating a parallax of each region of the stereoscopic image; setting conversion characteristics for correcting a parallax of the stereoscopic image based on the attention region and the parallax map; and correcting the parallax map based on the conversion characteristics.

In the embodiments of the present disclosure, an attention region which is estimated as a user paying attention thereto on a stereoscopic image is estimated; a parallax of the stereoscopic image is detected and a parallax map indicating a parallax of each region of the stereoscopic image is generated; conversion characteristics for correcting a parallax of the stereoscopic image are set based on the attention region and the parallax map; and the parallax map is corrected based on the conversion characteristics.

According to still another embodiment of the present disclosure, there is provided an image processing apparatus including an attention region estimation unit that estimates an attention region which is estimated as a user paying attention thereto on a stereoscopic image; a parallax detection unit that detects a parallax of the stereoscopic image and generates a parallax map indicating a parallax of each region of the stereoscopic image; a histogram generation unit that generates a histogram of a parallax of the stereoscopic image indicated by the parallax map by weighting a parallax of the attention region; a shift amount calculation unit that calculates a shift amount indicating a correction amount of the parallax of the stereoscopic image based on the histogram; and an image processing unit that corrects the parallax of the stereoscopic image by shifting at least one of a left eye image or a right eye image forming the stereoscopic image based on the shift amount.

According to still another embodiment of the present disclosure, there is provided an image processing method or a program including estimating an attention region which is estimated as a user paying attention thereto on a stereoscopic image; detecting a parallax of the stereoscopic image and generating a parallax map indicating a parallax of each region of the stereoscopic image; generating a histogram of a parallax of the stereoscopic image indicated by the parallax map by weighting a parallax of the attention region; calculating a shift amount indicating a correction amount of the parallax of the stereoscopic image based on the histogram; and correcting the parallax of the stereoscopic image by shifting at least one of a left eye image or a right eye image forming the stereoscopic image based on the shift amount.

In the embodiments of the present disclosure, an attention region which is estimated as a user paying attention thereto on a stereoscopic image is estimated; a parallax of the stereoscopic image is detected and a parallax map indicating a parallax of each region of the stereoscopic image is generated; a histogram of a parallax of the stereoscopic image indicated by the parallax map is generated by weighting a parallax of the attention region; a shift amount indicating a correction amount of the parallax of the stereoscopic image is calculated based on the histogram; and the parallax of the stereoscopic image is corrected by shifting at least one of a left eye image or a right eye image forming the stereoscopic image based on the shift amount.

According to still another embodiment of the present disclosure, there is provided an image processing apparatus including a scene recognition unit that performs scene recognition for a stereoscopic image; a parallax detection unit that detects a parallax of the stereoscopic image and generates a parallax map indicating a parallax of each region of the stereoscopic image; a setting unit that sets conversion characteristics for correcting a parallax of the stereoscopic image based on the parallax map; and a parallax conversion unit that corrects the parallax map based on the conversion characteristics and a result of the scene recognition.

According to still another embodiment of the present disclosure, there is provided an image processing method or a program including performing scene recognition for a stereoscopic image; detecting a parallax of the stereoscopic image and generates a parallax map indicating a parallax of each region of the stereoscopic image; setting conversion characteristics for correcting a parallax of the stereoscopic image based on the parallax map; and correcting the parallax map based on the conversion characteristics and a result of the scene recognition.

In the embodiments of the present disclosure, scene recognition for a stereoscopic image is performed; a parallax of the stereoscopic image is detected and a parallax map indicating a parallax of each region of the stereoscopic image is generated; conversion characteristics for correcting a parallax of the stereoscopic image is set based on the parallax map; and the parallax map is corrected based on the conversion characteristics and a result of the scene recognition.

According to the embodiments of the present disclosure, it is possible to more appropriately perform a parallax control of a stereoscopic image.

DETAILED DESCRIPTION OF EMBODIMENTS

Hereinafter, embodiments of the present disclosure will be described with reference to the drawings.
First Embodiment
Outline of Present Disclosure
First, an outline of the present disclosure will be described with reference to FIG. 1.

Figure 1:
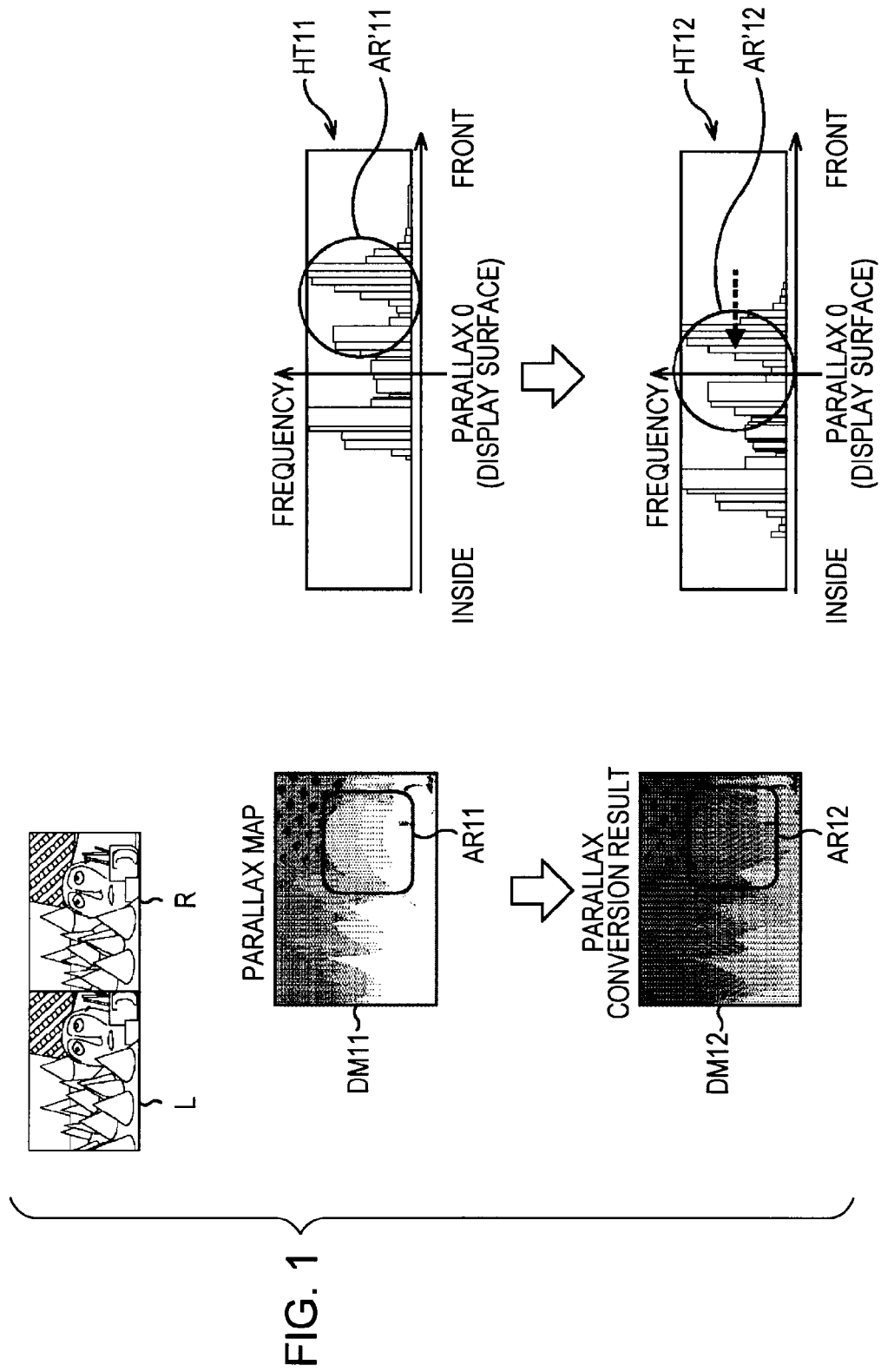
FIG. 1 is a diagram illustrating an outline of the present disclosure.

In the present disclosure, for example, a parallax control of a stereoscopic image including a left eye image L and a right eye image R is performed as shown in the upper part of FIG. 1. When the left eye image L and the right eye image R are input, a parallax map DM11 indicating parallaxes of the left eye image L and the right eye image R is first generated. In addition, for example, if a histogram HT11 of a parallax of each pixel on the stereoscopic image is generated from the parallax map DM11, a parallax distribution of each subject in the stereoscopic image can be found.

In addition, the transverse axis of the histogram HT11 indicates parallax, that is, a depth of the subject, and the longitudinal axis indicates a frequency of each parallax, that is, the number of pixels of the parallax map, having the parallax. Particularly, the right direction of the transverse axis of the histogram HT11 indicates a direction of the parallax where a subject is positioned on the front side when viewed from a viewing user, and the left direction of the transverse axis indicates a direction of the parallax where a subject is positioned on the depth side when viewed from the viewer. In addition, a subject having the parallax of "0" is positioned on a display surface which displays a stereoscopic image, and a subject having the parallax of a positive value is positioned further on the front side than the display surface when viewed from the user.

Here, for example, a region which is estimated as the user paying attention thereto on a stereoscopic image is referred to as an attention region, and a region on the parallax map DM11, placed at the same position as the attention region is assumed as a region AR11. In addition, it is assumed that distributions of the respective pixels in the region AR11 correspond to a region AR'11 part in the histogram HT11.

In this case, the parallax of the attention region on the stereoscopic image has a positive number, and thus the subject in the attention region is viewed on the front side of the display surface when viewed from the user. That is to say, the subject seems protruding. Generally, if a parallax of a subject to which the user pays attention is small, and the subject is positioned around the display surface, inconsistency between convergence and focus adjustment does not occur, and thus the user hardly feels exhausted.

Therefore, in the present disclosure, the parallax map is corrected, which is a corrected parallax map DM12, such that a subject of the attention region is positioned around the display surface, and a parallax of each subject on the stereoscopic image has a value in an appropriate parallax range giving a lesser burden to a user. In a parallax histogram HT12 obtained from the corrected parallax map DM12, parallax distributions of the respective pixels in the region AR12 placed at the same position as the attention region correspond to the AR'12 part of the histogram HT12, and this it can be seen that the subject of the attention region is positioned around the display surface.

If the corrected parallax map DM12 is obtained in this way, an image conversion is performed for the left eye image L and the right eye image R such that parallaxes of the left eye image L and the right eye image R become parallaxes shown in the corrected parallax map DM12, and thereby final left eye image L' and right eye image R' are generated.

In the image conversion, one image of the left eye image L and the right eye image R may be not converted and only the other image thereof may be converted, or both the left eye image L and the right eye image R may be converted and then new left eye image L' and the right eye image R' are generated.

In addition, the appropriate parallax range giving a lesser burden to a user when viewing a stereoscopic image is determined depending on a viewing distance of the stereoscopic image or a display device size.

Figure 2:
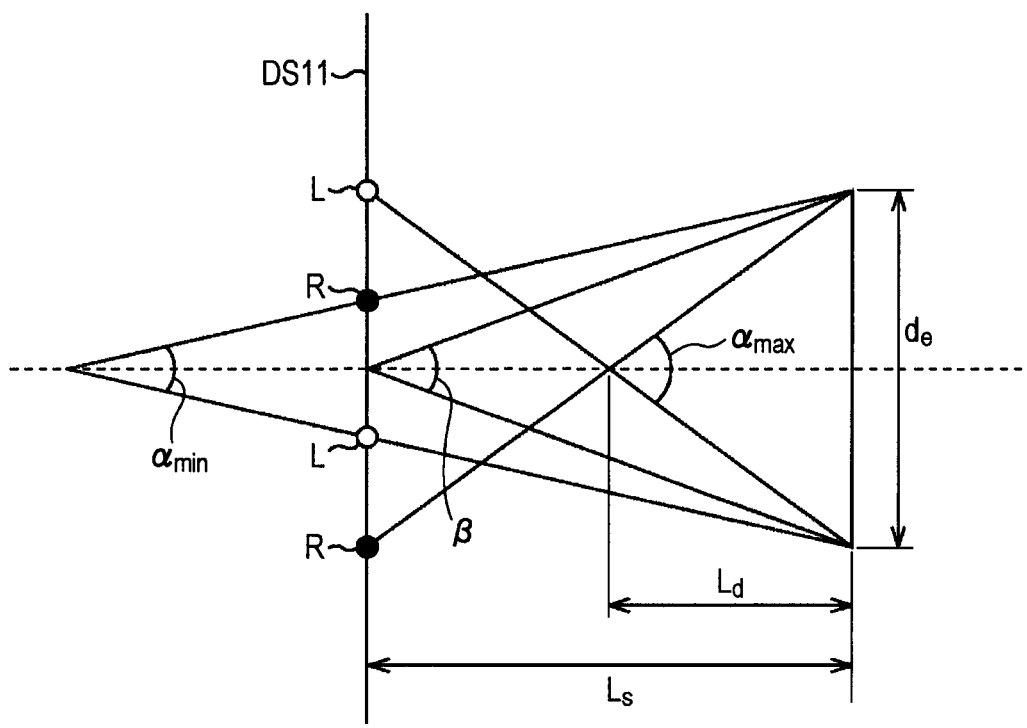
FIG. 2 is a diagram illustrating an appropriate parallax range.

For example, as shown in FIG. 2, it is assumed that a user views a stereoscopic image at a position of a viewing distance $L_s$ from a display surface DS11 which displays the stereoscopic image, and a binocular gap of the user is $d_e$. In addition, a distance between the user and a location of the subject on the stereoscopic image, that is, a position where a stereoscopic image of the subject is generated, is $L_d$, and a convergence angle in a case where the distance $L_d$ to the position where a stereoscopic image is generated is the same as the viewing distance $L_s$ is $\beta$.

In addition, it is assumed that a convergence angle relative to a location of a subject having a minimum value of a parallax in an appropriate parallax range, that is, a location of the subject on the deepest side, is $\alpha_{min}$, and an convergence angle relative to a location of a subject having a maximum value of a parallax in an appropriate parallax range is $\alpha_{max}$.

In a case where a user views a stereoscopic image on the display surface DS11 in the viewing condition shown in FIG. 2, it is generally said that the user can view the stereoscopic image comfortably if the following Expression (1) is satisfied. In addition, in Expression (1), α denotes a convergence angle relative to a location of the substrate on the stereoscopic image.

[Expression 1]
$$|\alpha - \beta| \leq 1° = \frac{\pi}{180} \quad \alpha = \beta \pm \frac{\pi}{180} \tag{1}$$

In addition, a relationship between the viewing distance $L_s$ and the convergence angle β is expressed by the following Expression (2)

[Expression 2]
$$\frac{\frac{d_e}{2}}{L_s} = \tan\frac{\beta}{2} \tag{2}$$

Therefore, if the above Expression (2) is modified, the following Expression (3) can be obtained.

[Expression 3]
$$\beta = 2\tan^{-1}\frac{d_e}{2L_s} \tag{3}$$

In addition, in a manner similar to Expression (2), a relationship between the distance $L_d$ where a stereoscopic image is generated and the convergence angle α is expressed by the following Expression (4).

[Expression 4]
$$L_d = \frac{d_e}{2\tan\frac{\alpha}{2}} \tag{4}$$

Here, since a range taken by the convergence angle α is $\alpha_{min} \leq \alpha \leq \alpha_{max}$, a range of a value taken by the distance $L_d$ to the position where a stereoscopic image is generated can be expressed by the following Expression (5).

[Expression 5]
$$\frac{d_e}{2\tan\frac{\alpha_{max}}{2}} \leq L_d \leq \frac{d_e}{2\tan\frac{\alpha_{min}}{2}} \tag{5}$$

In addition, from the above Expression (1), the convergence angle $\alpha_{min}=\beta-(\Pi/180)$, and $\alpha_{max}=\beta+(\Pi/180)$. Therefore, a subject parallax range where the viewer can view the stereoscopic image comfortably can be obtained from the binocular gap $d_e$ and the convergence angle β.

For example, in a case where a display device displaying a stereoscopic image is a 46V type display device, and the viewing distance $L_s$ is 1.7 m, if the distance $L_d$ between the user and locations of the respective substrates is in a range of 0.5 m to 1.5 m, the user can view the stereoscopic image comfortably. If the range of the distance $L_d$ is replaced with a parallax, the parallax is in a range of −56 pixels to 55 pixels.

Configuration Example of Image Processing Apparatus

Figure 3:
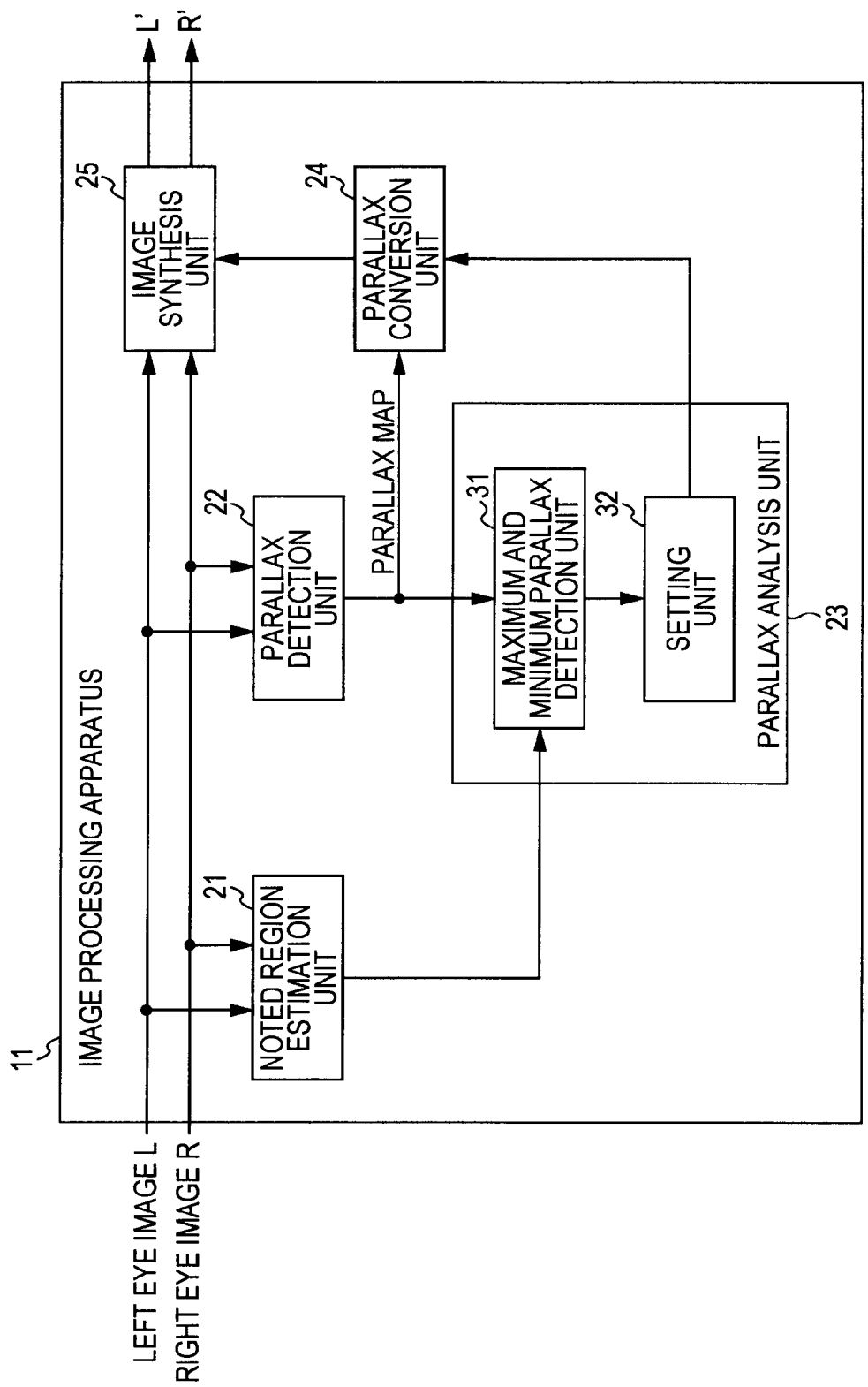
FIG. 3 is a diagram illustrating a configuration example of the image processing apparatus according to an embodiment.

Next, an image processing apparatus according to an embodiment of the present disclosure will be described. FIG. 3 is a diagram illustrating a configuration example of the image processing apparatus according to an embodiment of the present disclosure.

An image processing apparatus 11 includes an attention region estimation unit 21, a parallax detection unit 22, a parallax analysis unit 23, a parallax conversion unit 24, and an image synthesis unit 25. In the image processing apparatus 11, a left eye image L and a right eye image R forming a stereoscopic image are supplied to the attention region estimation unit 21, the parallax detection unit 22, and the image synthesis unit 25.

The attention region estimation unit 21 estimates an attention region on the stereoscopic image based on the supplied left eye image L and right eye image R, and supplies the estimation result to the parallax analysis unit 23. Here, the attention region is a region which is estimated as the user who views the stereoscopic image paying attention thereto.

The parallax detection unit 22 generates a parallax map indicating a parallax of each pixel on the stereoscopic image based on the supplied left eye image L and right eye image R, and supplies the generated parallax map to the parallax analysis unit 23 and the parallax conversion unit 24.

The parallax analysis unit 23 defines parallax conversion characteristics used for parallax correction of the stereoscopic image, more specifically, correction of the parallax map, based on the estimation result from the attention region estimation unit 21 and the parallax map from the parallax detection unit 22, and supplies the defined parallax conversion characteristics to the parallax conversion unit 24. The parallax analysis unit 23 includes a maximum and minimum parallax detection portion 31 and a setting portion 32.

The maximum and minimum parallax detection portion 31 detects a maximum value and a minimum value (hereinafter, referred to as a maximum parallax and a minimum parallax) of a pixel value (parallax) of each pixel of the parallax map from the parallax detection unit 22. In addition, the maximum and minimum parallax detection portion 31 detects a parallax of the attention region (hereinafter, referred to as an attention parallax) based on the parallax map from the parallax detection unit 22 and the estimation result from the attention region estimation unit 21, and supplies the attention parallax, the maximum parallax, and the minimum parallax to the setting portion 32.

The setting portion 32 defines conversion characteristics based on the attention parallax, the maximum parallax, and the minimum parallax from the maximum and minimum parallax detection portion 31, so as to be supplied to the parallax conversion unit 24.

The parallax conversion unit 24 converts a parallax of each pixel of the parallax map from the parallax detection unit 22 based on the conversion characteristics from the setting portion 32, so as to correct the parallax map, and supplies a corrected parallax map obtained as a result thereof and the parallax map to the image synthesis unit 25. The image synthesis unit 25 adjusts a parallax of the stereoscopic image by performing an image conversion for the supplied left eye image L and right eye image R based on the corrected parallax map and the parallax map from the parallax conversion unit 24, and outputs left eye image L' and right eye image R' obtained as a result thereof.

Description of Image Conversion Process

When the image processing apparatus 11 shown in FIG. 3 is supplied with a stereoscopic image formed by the left eye image L and the right eye image R and is instructed to adjust a parallax of the stereoscopic image, it adjust a parallax of the stereoscopic image through an image conversion process, and outputs the stereoscopic image where the parallax is adjusted. Hereinafter, the image conversion process performed by the image processing apparatus 11 will be described with reference to the flowchart in FIG. 4.

In step S11, the attention region estimation unit 21 estimates an attention region on a stereoscopic image based on at least one of a left eye image L and a right eye image R which have been supplied, and supplies information indicating the attention region to the maximum and minimum parallax detection portion 31. For example, the attention region estimation unit 21 estimates the attention region by performing face recognition, visual attention, scene recognition, and the like.

Specifically, for example, if a face region is detected from the left eye image L and the right eye image R through the face recognition, the face region is used as the attention region. In addition, for example, in a case where the visual attention is performed, a predetermined feature amount such as luminance information, color information, or edge information is extracted from the left eye image L or the right eye image R, and a region which has a large luminance difference on an image or a region which has colors different from the periphery is detected and is used as the attention region.

In addition, the attention region estimation unit 21 may detect an object region which has a large area on the left eye image L or the right eye image R, or a moving subject region, and use such a region as the attention region.

In step S12, the parallax detection unit 22 detects a parallax of the stereoscopic image based on the supplied left eye image L and right eye image R, and generates a parallax map.

For example, the parallax detection unit 22 sequentially uses each pixel of the right eye image R as an attention pixel and detects a pixel (hereinafter, referred to as a corresponding pixel) of the left eye image L corresponding to the attention pixel, thereby obtaining a parallax of each pixel of the right eye image R relative to the left eye image L.

At this time, a difference between a region around the attention pixel on the right eye image R and a region around each pixel on the left eye image L, more specifically, for example, a sum of absolute difference values of pixels in the region is calculated, and a pixel of the left eye image L where the difference becomes the minimum is a corresponding pixel relative to the attention pixel. In addition, a distance between the attention pixel of the right eye image R and the corresponding pixel of the left eye image L is a parallax between the pixels, and the parallax is a pixel value of a pixel of the parallax map, which is located at the same position as the attention pixel.

In addition, although an example where the parallax map using the right eye image R as a reference is generated using each pixel of the right eye image R as an attention pixel has been described here, a parallax map using the left eye image L as a reference may be generated, or a parallax map using each of the left eye image L and the right eye image R as a reference may be generated.

If the parallax map is generated in this way, the parallax detection unit 22 supplies the generated parallax map to the maximum and minimum parallax detection portion 31 and the parallax conversion unit 24, and the flow proceeds to step S13.

In step S13, the maximum and minimum parallax detection portion 31 detects a maximum parallax and a minimum parallax based on the parallax map supplied from the parallax detection unit 22. That is to say, the maximum value and the minimum value of the parallaxes of the respective pixels on the parallax map are detected, and are respectively used as the maximum parallax and the minimum parallax.

In step S14, the maximum and minimum parallax detection portion 31 detects a parallax of the attention region based on the parallax map supplied from the parallax detection unit 22 and the estimation result of the attention region supplied from the attention region estimation unit 21.

For example, the maximum and minimum parallax detection portion 31 designates an average value of pixel values (parallaxes) of pixels in the same region as the attention region on the parallax map as an attention parallax which is a parallax of the attention region. In addition, a centroid value of pixel values of pixels in the same region as the attention region on the parallax map may be used as the attention parallax, or the most common pixel value of pixel values of pixels in the same region as the attention region may be used as the attention parallax.

The maximum and minimum parallax detection portion 31 obtains the attention parallax of the attention region, and supplies the maximum parallax, the minimum parallax, and the attention parallax to the setting portion 32, and the flow proceeds to step S15.

In step S15, the setting portion 32 sets conversion characteristics based on the maximum parallax, the minimum parallax, and the attention parallax supplied from the maximum and minimum parallax detection portion 31.

For example, it is assumed that an appropriate parallax range described with reference to FIG. 2 is obtained in advance, and a maximum value and a minimum value of the parallax range are respectively an allowable maximum parallax $d_{max}'$ and an allowable minimum parallax $d_{min}'$. In addition, the maximum parallax, the minimum parallax, and the attention parallax are respectively denoted by $d_{max}$, $d_{min}$, and $d_{at}$.

Figure 5:
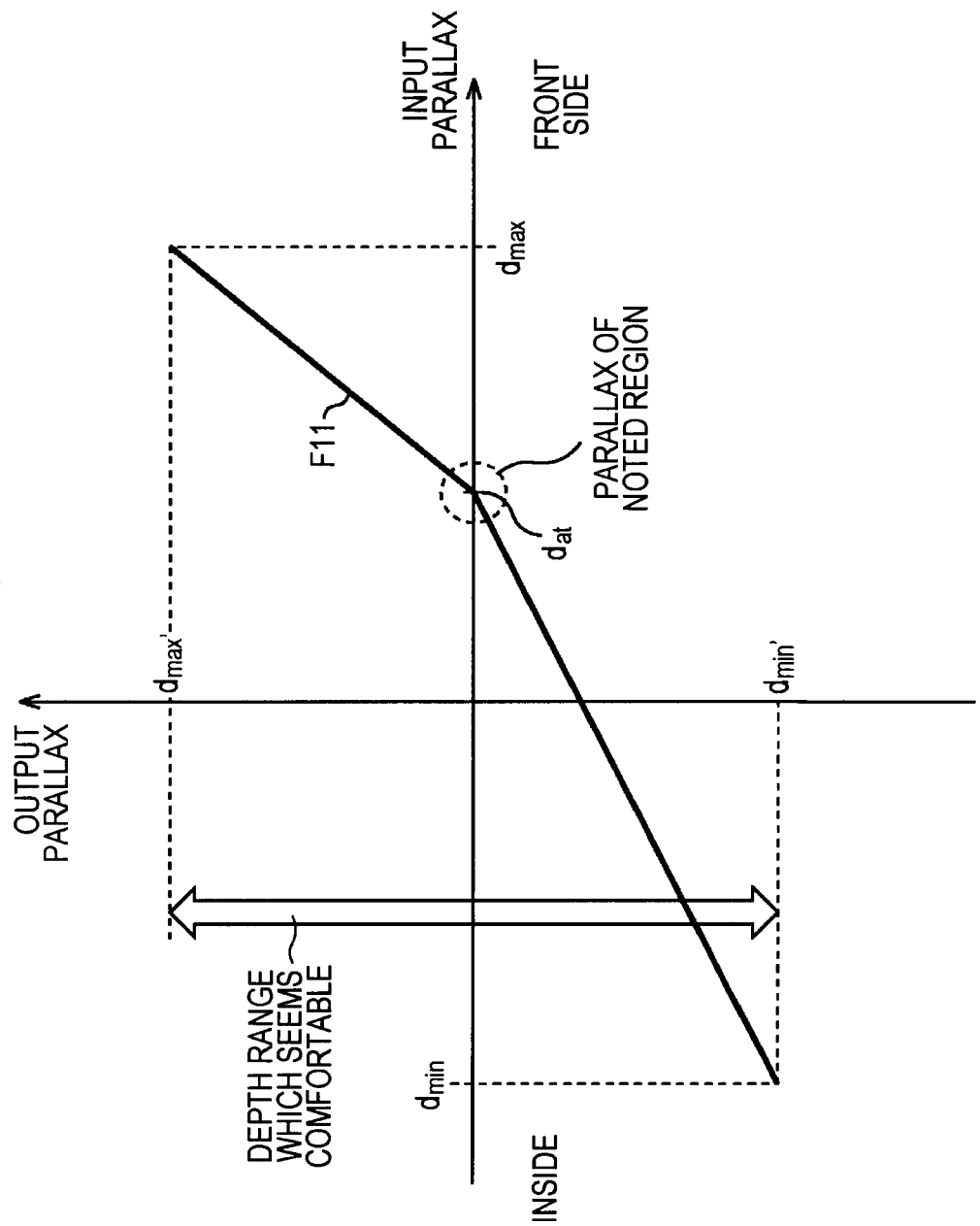
FIG. 5 is a diagram illustrating an example of the conversion function.

In this case, as shown in FIG. 5, the setting portion 32 defines the conversion characteristics such that each parallax on the parallax map is converted into a parallax in a range from the allowable minimum parallax $d_{min}'$ to the allowable maximum parallax $d_{max}'$ (hereinafter, referred to as an allowable parallax range), and the attention parallax $d_{at}$ is converted into a parallax "0". That is to say, a conversion function for converting each parallax $d_i$ on the parallax map into a corrected parallax $d_o$ is defined so as to satisfy such conditions.

Further, in FIG. 5, the transverse axis indicates a parallax $d_i$ of each pixel on the parallax map, and the longitudinal axis indicates a corrected parallax $d_o$. In addition, in the figure, the bent line F11 indicates a graph of the conversion function.

In the conversion function indicated by the bent line F11, the maximum parallax $d_{max}$ is converted into the allowable maximum parallax $d_{max}'$ and the minimum parallax $d_{min}$ is converted into the allowable minimum parallax $d_{min}'$. In addition, the attention parallax $d_{at}$ is converted into 0. In addition, the section of the conversion function from the attention parallax $d_{at}$ to the maximum parallax $d_{max}$ is a first-order function with a predetermined slope, and, in a similar manner, the section from the minimum parallax $d_{min}$ to the attention parallax $d_{at}$ is also a first-order function, but the entire conversion function is a nonlinear function.

As such, if the parallax of the attention region is converted into 0, a depth position of the attention region becomes a display surface of the stereoscopic image, and thus it is possible to reduce eye fatigue of a user. In addition, parallaxes of the entire stereoscopic image are in the allowable parallax range, and thus a user can view the stereoscopic image comfortably.

The setting portion 32 defines the conversion function in this way, and supplies the defined conversion function to the parallax conversion unit 24 as conversion characteristics.

In addition, the conversion characteristics are not limited to the example shown in FIG. 5, and may be a function indicated by a bent line which monotonously increases for a parallax or may be any function.

Figure 6:
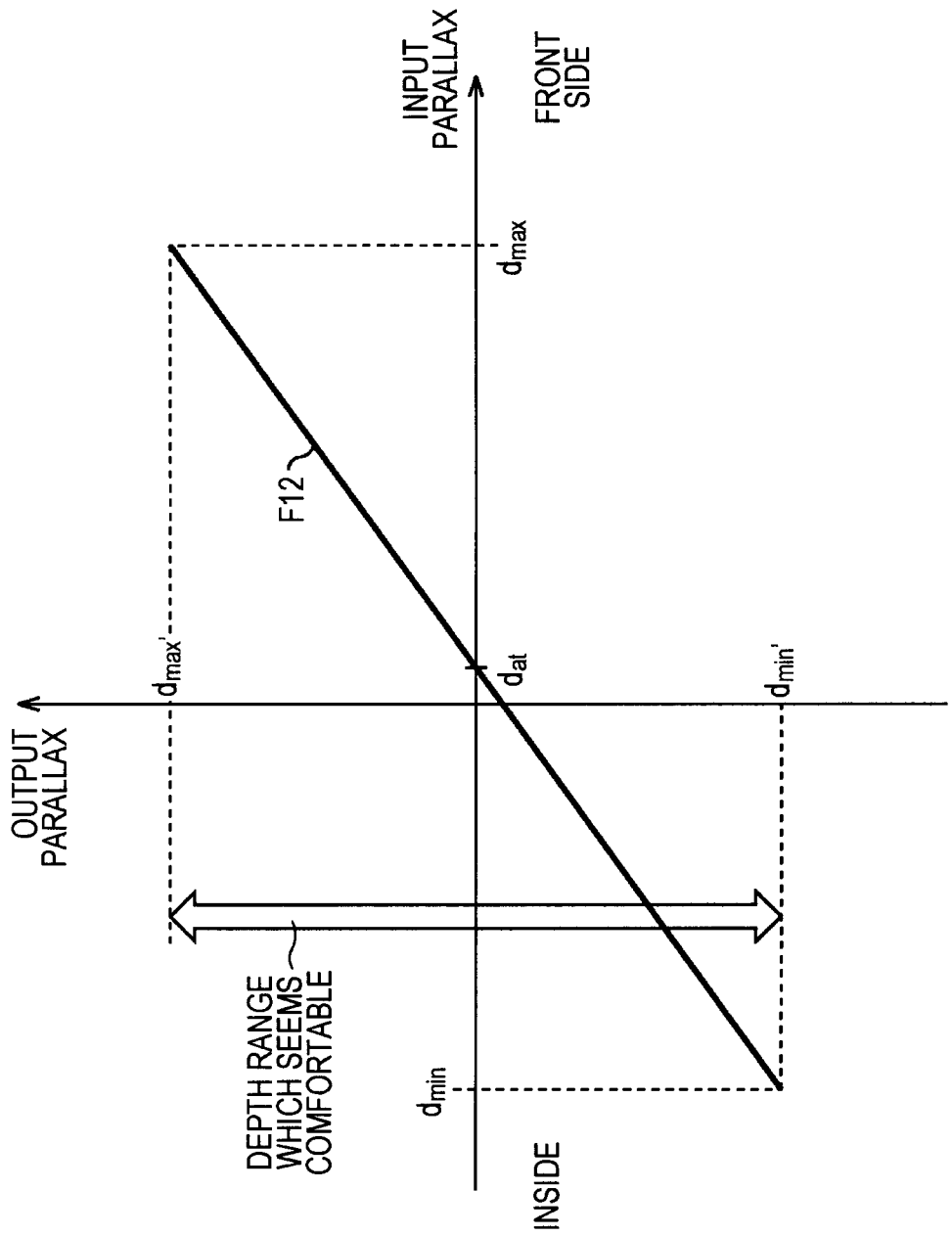
FIG. 6 is a diagram illustrating an example of the conversion function.

Therefore, for example, a linear function shown in FIG. 6 may be a conversion function. In FIG. 6, the transverse axis indicates a parallax $d_i$ of each pixel on the parallax map, and the longitudinal axis indicates a corrected parallax $d_o$. In addition, in the figure, the straight line F12 indicates a graph of the conversion function. In the example shown in FIG. 6, the conversion function indicated by the straight line F12 is a first-order function.

Referring to the flowchart of FIG. 4 again, in step S16, the parallax conversion unit 24 generates a corrected parallax map based on the conversion characteristics from the setting portion 32 and the parallax map from the parallax detection unit 22, and supplies the corrected parallax map and the parallax map to the image synthesis unit 25.

For example, the parallax conversion unit 24 obtains a corrected parallax $d_o$ by assigning the parallax $d_i$ of the pixel of the parallax map to the conversion function as the conversion characteristics, and designates the corrected parallax obtained as a pixel value of a pixel of the corrected parallax map, located at the same position as the pixel.

In addition, the calculation of the corrected parallax using the conversion function may be realized using a conversion table where each parallax $d_i$ is correlated with a corrected parallax $d_o$ which is obtained through conversion of the parallax $d_i$. In this case, when conversion characteristics are supplied from the setting portion 32, the parallax conversion unit 24 generates a conversion table having the conversion characteristics, and converts the parallax map into a corrected parallax map using the conversion table.

In step S17, the image synthesis unit 25 converts the supplied left eye image L and right eye image R into a left eye image L' and a right eye image R' having appropriate parallaxes using the corrected parallax map and the parallax map from the parallax conversion unit 24, and outputs the converted images.

For example, it is assumed that the parallax detection unit 22 generates a parallax map using the right eye image R as a reference, the attention region estimation unit 21 estimates an attention region on the right eye image R, and the parallax conversion unit 24 generates a corrected parallax map using the right eye image R as a reference.

Figure 7:
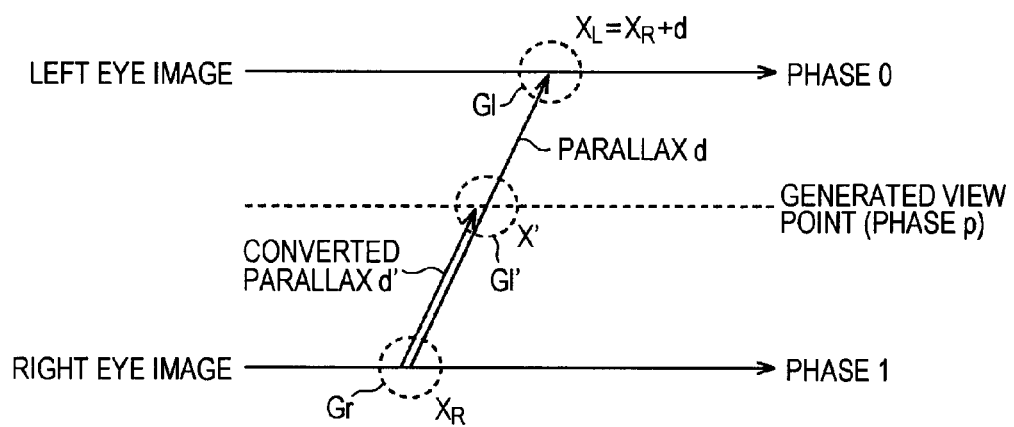
FIG. 7 is a diagram illustrating an image conversion.

In this case, the image synthesis unit 25 uses the right eye image R as a right eye image R' for output without conversion, and, as shown in FIG. 7, generates an image of a phase of a parallax specified by the pixel of the corrected parallax map from the right eye image R and the left eye image L, and uses the generated image as a left eye image L'.

In addition, in FIG. 7, the transverse direction of the figure indicates a direction of parallaxes (horizontal direction) of the left eye image L and the right eye image R. For example, it is assumed that a corresponding pixel of the pixel Gr on the right eye image R is a pixel Gl on the left eye image L, and a pixel value (parallax) of the pixel on the parallax map located at the same position as the pixel Gr is d.

In this case, if a position of the pixel Gr in the transverse direction (hereinafter, referred to as an x coordinate) of the figure is $x_R$, an x coordinate $x_L$ of the pixel Gl is $x_R+d$. In addition, if a pixel value (parallax) of the pixel on the corrected parallax map, located at the same position as the pixel Gr is d' (here, d>d'), a pixel Gl' of an image of a phase p of a parallax between a phase 1 of the parallax of the right eye image R and a phase 0 of the parallax of the left eye image L is generated as a pixel of the left eye image L' after the image conversion.

That is to say, a calculation of the following Expression (6) is performed, and a pixel value $I_M(x')$ of the pixel Gl' is calculated.

[Expression 6]

$$I_M(x') = I_M(x_R + d') = \frac{d' I_L(x_L) + |d - d'| I_R(x_R)}{d' + |d - d'|} \quad (6)$$

In addition, in Expression (6), $I_L(x_L)$ and $I_R(x_R)$ respectively indicate pixel values of the pixel Gl and the pixel Gr. In addition, the phase p of the generated parallax is p=d'/(d'+|d−d'|).

In this way, the image synthesis unit 25 performs the calculation shown in Expression (6) for each pixel on the right eye image R, generates the new left eye image L' having the parallax d' with the right eye image R, and outputs a stereoscopic image formed by the right eye image R' and the left eye image L' as a stereoscopic image after the parallax is adjusted.

In addition, although an example where the right eye image R is used as the right eye image R' without conversion and the left eye image L is converted into the left eye image L' has been described, the left eye image L may be used as the left eye image L' without conversion, and the right eye image R may be converted into the right eye image R'.

Further, the right eye image R and the left eye image L may be respectively converted into the right eye image R' and the left eye image L'. In this case, the attention region estimation unit 21 detects an attention region from each of the right eye image R and the left eye image L, and the parallax detection unit 22 generates a parallax map having the right eye image R as a reference and a parallax map having the left eye image L as a reference.

In addition, conversion characteristics are defined from an attention region on the right eye image R and a parallax map having the right eye image R as a reference, and the parallax map is converted into a corrected parallax map. In the same manner, conversion characteristics are defined from an attention region on the left eye image L and a parallax map having the left eye image L as a reference, and the parallax map is converted into a corrected parallax map.

In addition, each pixel on the right eye image R and a corresponding pixel on the left eye image L corresponding to the pixel are used, a pixel value of a pixel of an image which is different from a parallax and a phase of the right eye image R by half of the parallax d' of the pixel of the corrected parallax map having the right eye image R as a reference is obtained, and thereby the left eye image L' is generated. In the same manner, each pixel on the left eye image L and a corresponding pixel on the right eye image R corresponding to the pixel are used, a pixel value of a pixel of an image which is different from a parallax and a phase of the left eye image L by half of the parallax d' of the pixel of the corrected parallax map having the left eye image L as a reference is obtained, and thereby right eye image R' is generated.

In this way, in the image processing apparatus 11, an attention region is positioned around the display surface displaying a stereoscopic image based on the parallax map and the attention region, and conversion characteristics are defined such that a parallax of each pixel of the stereoscopic image becomes a parallax in the allowable parallax range, thereby performing parallax adjustment. Thereby, a parallax of the stereoscopic image can be more appropriately controlled, and thus a user can view the stereoscopic image more comfortably. As a result, it is possible to reduce eye fatigue of a user.

Second Embodiment

Configuration Example of Image Processing Apparatus

Although a case where all the pixels of the parallax map are converted by the same conversion function (conversion characteristics) has been described, a different conversion function may be used in a region at the same position as an attention region on the parallax map and in a region a position different from the attention region.

Figure 8:
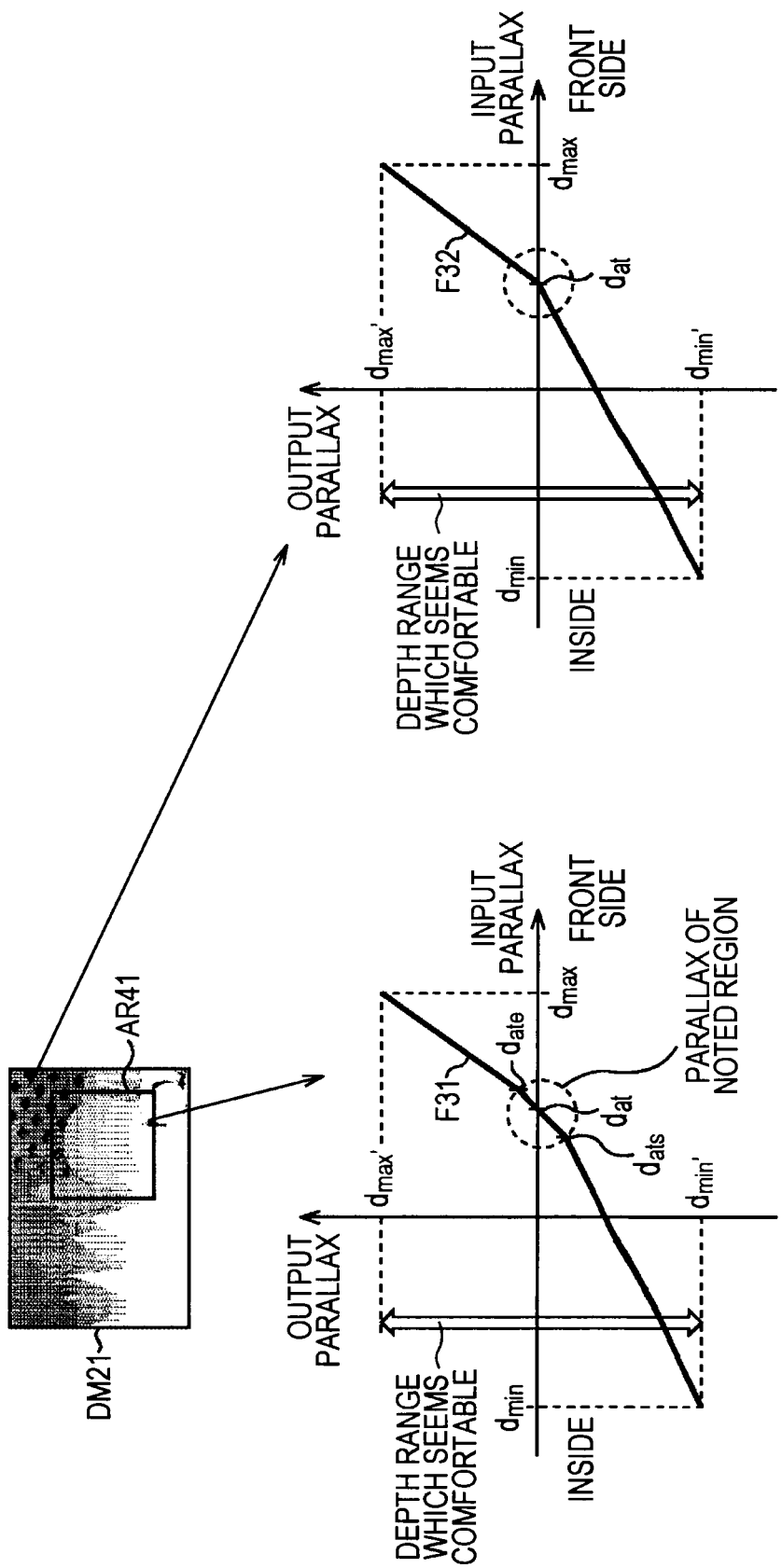
FIG. 8 is a diagram illustrating a conversion function for each region.

In this case, for example, as shown in FIG. 8, a region AR41 located at the same position as an attention region on a parallax map DM21 is specified. In addition, as shown in the lower part of the figure, a conversion function for a parallax of each pixel in the region AR41 and a conversion function of a parallax of each pixel outside the region AR41 are defined.

In the example shown in FIG. 8, a bent line F31 indicates a conversion function of a parallax of each pixel in the region AR41, and a bent line F32 indicates a conversion function of a parallax of each pixel outside the region AR41. In addition, in the graph of the conversion function, the transverse axis indicates a parallax $d_i$ of each pixel on the parallax map, and the longitudinal axis indicates a corrected parallax $d_o$.

In the conversion function indicated by the bent line F31, the attention parallax $d_{at}$ is converted into 0, and in the section from the parallax $d_{ats}$ including the attention parallax $d_{at}$ to the parallax $d_{ate}$, the conversion function is a first-order function with a predetermined slope.

In addition, the parallax $d_{ats}$, the parallax $d_{ate}$, or a slope of the conversion function in the section between the parallax $d_{ats}$ and the parallax $d_{ate}$ may be predefined, or may be set by a user. In addition, the parallax $d_{ats}$ and the parallax $d_{ate}$ may be defined based on a parallax of each pixel in the region AR41. In this case, for example, a minimum value and a maximum value of parallaxes of pixels in the region AR41 respectively become the parallax $d_{ats}$ and the parallax $d_{ate}$.

In addition, in the conversion function indicated by the bent line F31, the maximum parallax $d_{max}$ and the minimum parallax $d_{min}$ of the pixels on the parallax map are respectively converted into an allowable maximum parallax $d_{max}'$ and an allowable minimum parallax $d_{min}'$, and thus the conversion function is continuous in the overall sections. In this example as well, the section between the minimum parallax $d_{min}$ and the parallax $d_{ats}$, and the section between the parallax $d_{ate}$ and the maximum parallax $d_{max}$ show a first-order function.

In contrast, in the conversion function indicated by the bent line F32, the maximum parallax $d_{max}$ and the minimum parallax $d_{min}$ are respectively converted into an allowable maximum parallax $d_{max}'$ and an allowable minimum parallax $d_{min}'$. In addition, the attention parallax $d_{at}$ is converted into 0. That is to say, the conversion function indicated by the bent line F32 is the same as the conversion function indicated by the bent line F11 in FIG. 5.

As such, if the parallax map is converted using the conversion functions having different conversion characteristics inside and outside the region AR41 of the parallax map DM21 located at the same position as the attention region, it is possible to more appropriately control a parallax of the attention region of the stereoscopic image. Particularly, characteristics of sections around the attention region in the conversion function inside the region AR41 are linear functions (first-order functions), and thereby it is possible to suppress distortion of depth around the attention region.

Figure 9:
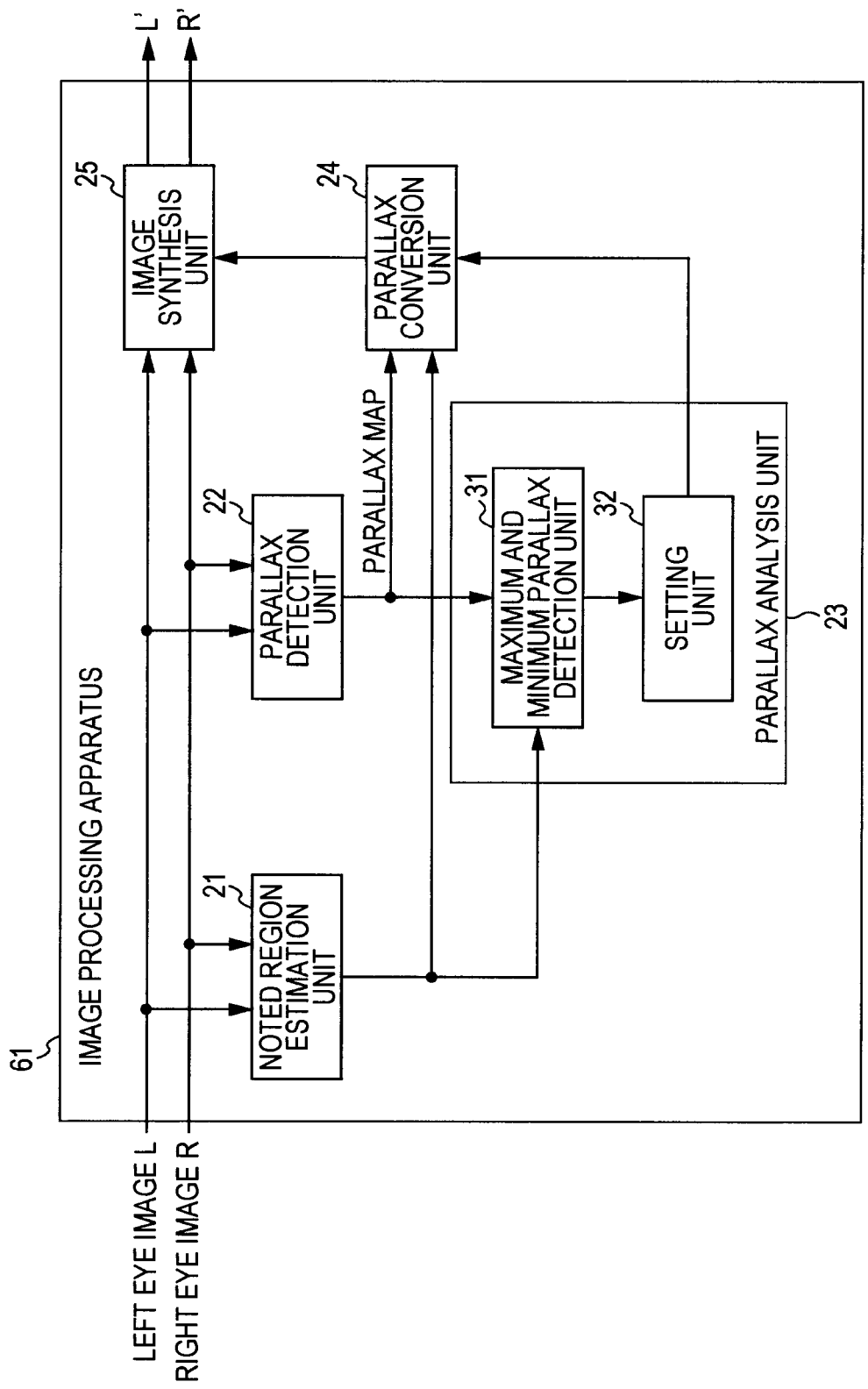
FIG. 9 is a diagram illustrating another configuration example of the image processing apparatus.

As such, in a case where a parallax map is converted into a corrected parallax map with different conversion characteristics according to regions of the parallax map, an image processing apparatus is configured, for example, as shown in FIG. 9. In addition, in FIG. 9, parts corresponding to the case in FIG. 3 are given the same reference numerals, and description thereof will be appropriately omitted.

An image processing apparatus 61 in FIG. 9 is the same as the image processing apparatus 11 in FIG. 3 in that the image processing apparatus 61 includes the attention region estimation unit 21 to the image synthesis unit 25. However, in the image processing apparatus 61, an estimation result of the attention region obtained by the attention region estimation unit 21 is supplied to the maximum and minimum parallax detection portion 31 of the parallax analysis unit 23 and the parallax conversion unit 24. In addition, the parallax conversion unit 24 performs conversion of a parallax map for each region based on the estimation result of the attention region and the conversion characteristics.

Description of Image Conversion Process

Figure 10:
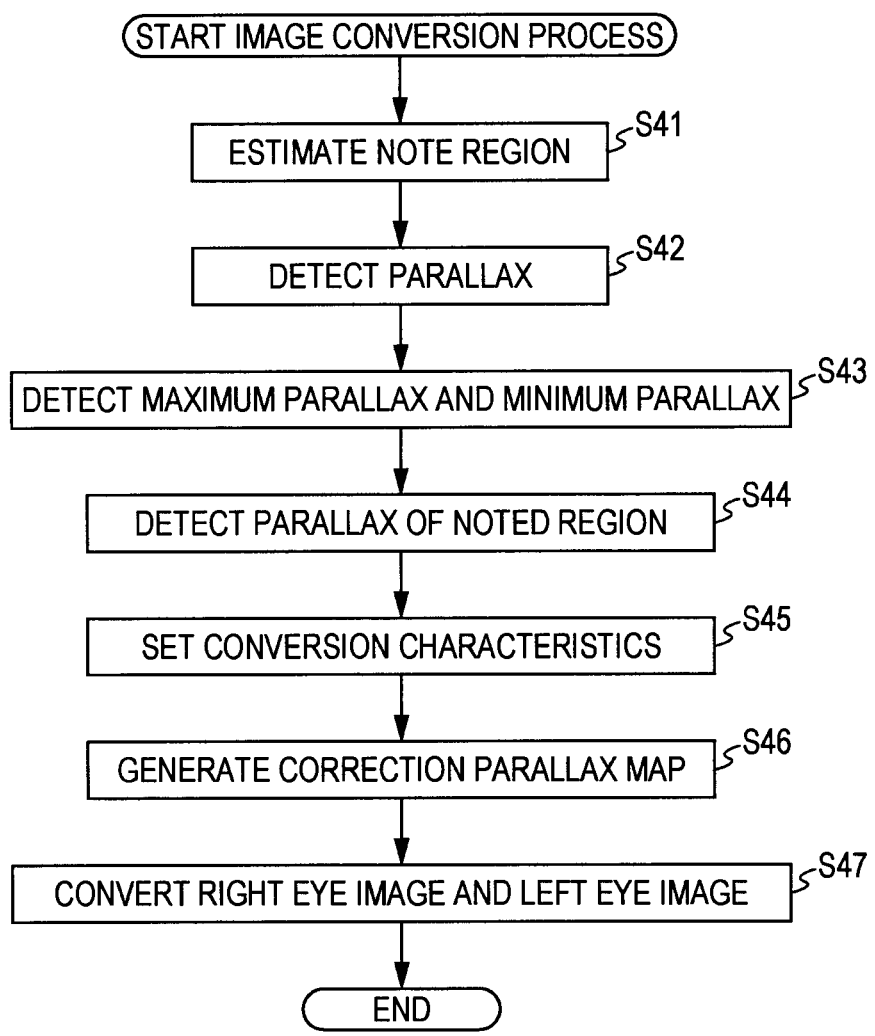
FIG. 10 is a flowchart illustrating an image conversion process.

Next, an image conversion process performed by the image processing apparatus 61 will be described with reference to the flowchart of FIG. 10. In addition, the processes in steps S41 to S44 are the same as those in the steps S11 to S14 of FIG. 4, and thus description thereof will be omitted.

However, in step S41, an estimation result of the attention region is supplied to the maximum and minimum parallax detection portion 31 and the parallax conversion unit 24 from the attention region estimation unit 21.

In step S45, the setting portion 32 sets conversion characteristics based on the maximum parallax, the minimum parallax, and the attention parallax supplied from the maximum and minimum parallax detection portion 31. Specifically, for example, as described with reference to FIG. 8, a conversion function for a region located at the same position as the attention region on the parallax map and a conversion function for a region located at a position different from the attention region on the parallax map, are set. The setting portion 32 supplies the conversion function set for each region to the parallax conversion unit 24.

In step S46, the parallax conversion unit 24 converts the parallax map from the parallax detection unit 22 into a corrected parallax map based on the conversion functions (conversion characteristics) from the setting portion 32 and the estimation result from the attention region estimation unit 21.

That is to say, the parallax conversion unit 24 converts a parallax of each pixel of the parallax map into a corrected parallax using the conversion function for a region which is located at the same position as the attention region on the parallax map. In addition, the parallax conversion unit 24 converts a parallax of each pixel of the parallax map into a corrected parallax using the conversion function for a region which is located at a position different from the attention region on the parallax map. In this way, the corrected parallax is obtained using the conversion function set for each region of the parallax map, and thereby a corrected parallax map is generated.

The corrected parallax map is generated, and, thereafter, the image conversion process finishes through a process in step S47. This process is the same as the process in step S17 of FIG. 4, and thus description thereof will be omitted.

The image processing apparatus 61 sets a conversion function for each region of the parallax map, particularly, conversion functions for a region which is the same as the attention region and the other region, and coverts the parallax map into a corrected parallax map. Thereby, it is possible to more appropriately control a parallax of the attention region.

Third Embodiment
Configuration Example of Image Processing Apparatus

Although a case where a parallax of the stereoscopic image is adjusted based on the corrected parallax map has been described in the above description, a parallax may be adjusted by calculating a shift amount using a parallax of each pixel of a stereoscopic image, particularly, a parallax of an attention region, and shifting the left eye image L and the right eye image R.

Figure 11:
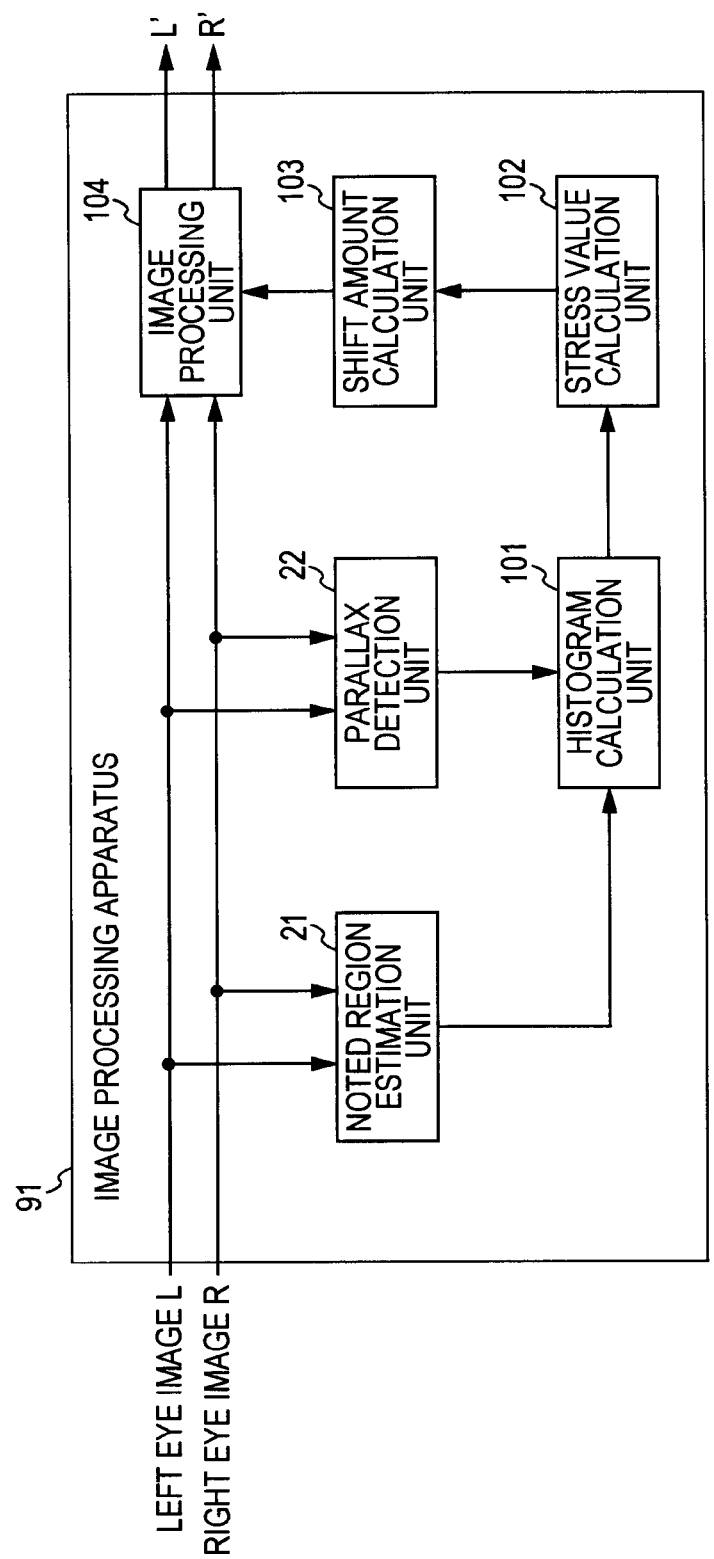
FIG. 11 is a diagram illustrating still another configuration example of the image processing apparatus.

In this case, an image processing apparatus is configured, for example, as shown in FIG. 11. In addition, in FIG. 11, parts corresponding to the case in FIG. 3 are given the same reference numerals, and description thereof will be appropriately omitted.

An image processing apparatus 91 in FIG. 11 includes an attention region estimation unit 21, a parallax detection unit 22, a histogram calculation unit 101, a stress value calculation unit 102, a shift amount calculation unit 103, and an image processing unit 104.

The histogram calculation unit 101 generates a parallax histogram for each region on a stereoscopic image based on a parallax map from the parallax detection unit 22 and an attention region from the attention region estimation unit 21, and supplies the parallax histogram to the stress value calculation unit 102. When the histogram is generated, a parallax of each pixel of the attention region is weighted.

In a case of adjusting a parallax by shifting the left eye image L and the right eye image R by a predetermined amount based on the histogram supplied from the histogram calculation unit 101, the stress value calculation unit 102 calculates a stress value indicating stress which a user feels when viewing the stereoscopic image where the parallax is adjusted, and supplies the stress value to the shift amount calculation unit 103. The shift amount calculation unit 103 calculates a shift amount which minimizes the stress value supplied from the stress value calculation unit 102, and supplies the shift amount to the image processing unit 104.

The image processing unit 104 shifts the supplied left eye image L and right eye image R based on the shift amount from the shift amount calculation unit 103, and generates and outputs a left eye image L' and a right eye image R'.

Description of Image Conversion Process

Figure 12:
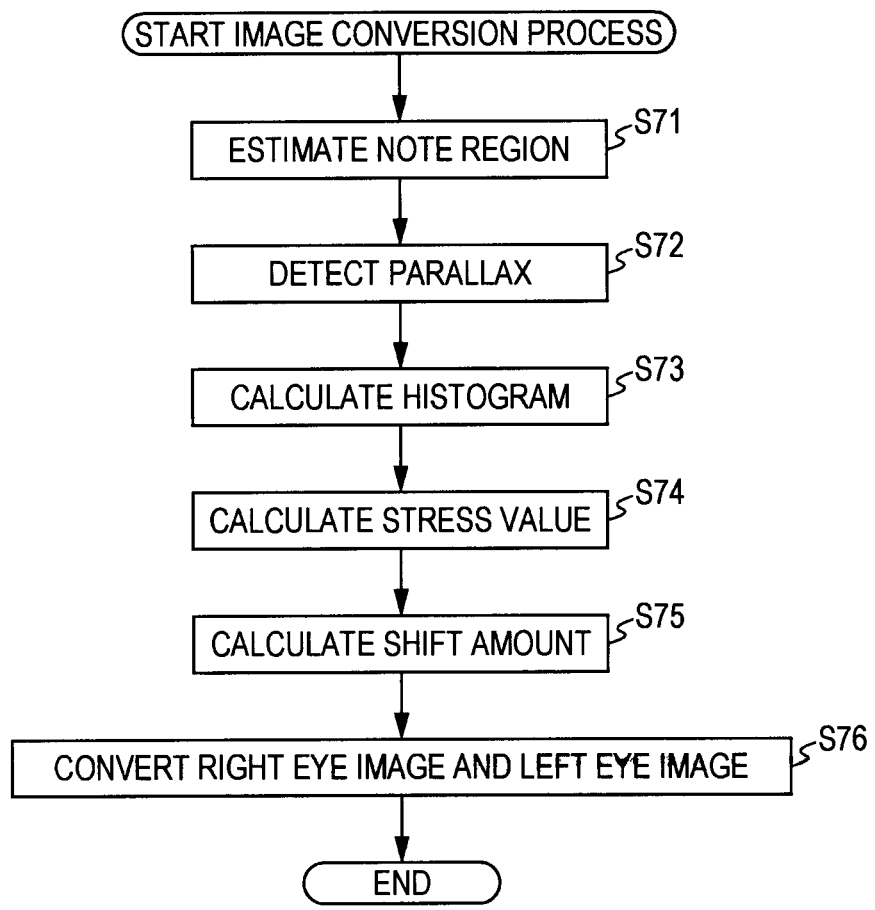
FIG. 12 is a flowchart illustrating an image conversion process.

Next, an image conversion process performed by the image processing apparatus 91 will be described with reference to the flowchart of FIG. 12.

In step S71, the attention region estimation unit 21 estimates an attention region based on the left eye image L and the right eye image R which has been supplied, and supplies the estimation result to the histogram calculation unit 101. For example, the attention region is estimated through a process such as face recognition or visual attention.

Specifically, for example, in the face detection, coordinates of the vertices of a rectangular region including a person's face on the left eye image L or the right eye image R, or a size of the rectangular region is detected.

In addition, for example, in a case where the image processing apparatus 91 is an imaging apparatus capturing a stereoscopic image, information or the like obtained through an automatic focus process when capturing a stereoscopic image may be used. In other words, since a region of a subject where focus is adjusted on the stereoscopic image is specified in contrast type automatic focusing, the region of the subject where focus is adjusted is an attention region to which a user pays attention.

Figure 4:
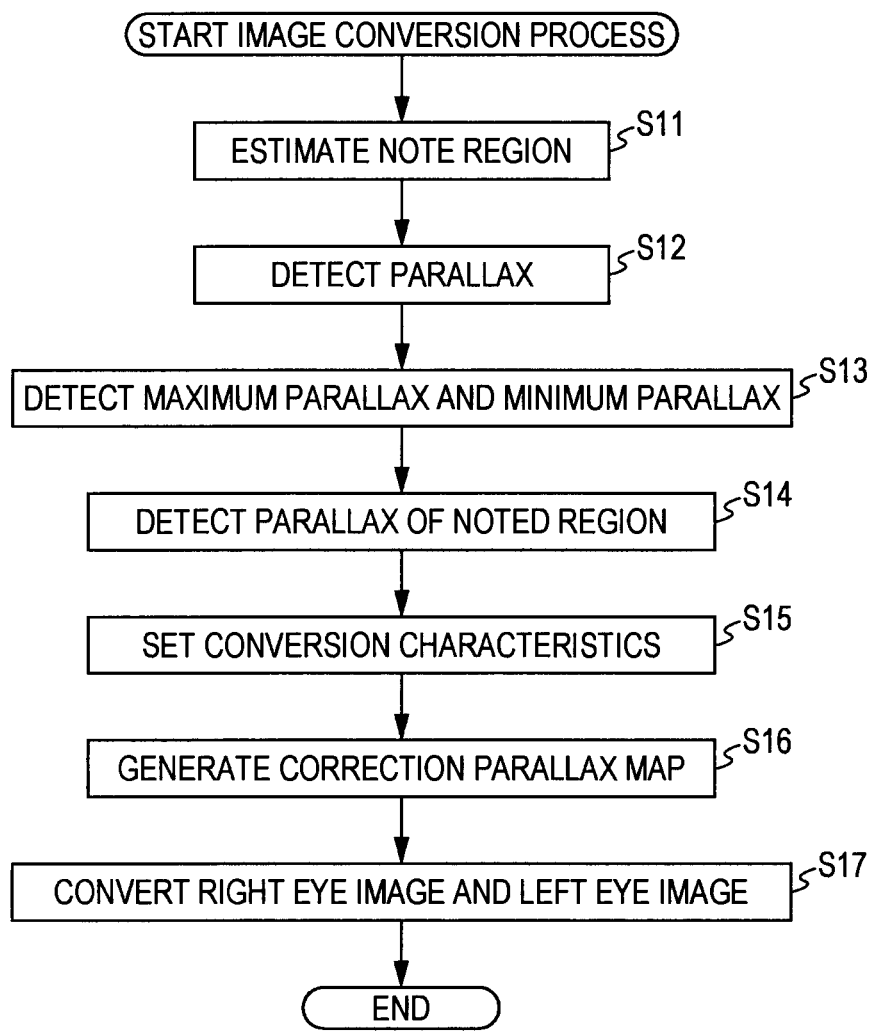
FIG. 4 is a flowchart illustrating an image conversion process.

As such, in a case where an attention region is estimated using information regarding the automatic focusing, it is possible to adjust a parallax of the stereoscopic image with respect to a subject to which a user capturing the stereoscopic image pays attention. In addition, in step S71, the same process as the process in step S11 of FIG. 4 is performed.

In step S72, the parallax detection unit 22 detects a parallax based on the supplied left eye image L and right eye image R, and supplies a parallax map obtained as a result thereof to the histogram calculation unit 101. In addition, in step S72, the same process as the process in step S12 of FIG. 4 is performed.

In step S73, the histogram calculation unit 101 generates a histogram indicating a parallax distribution for each region on the stereoscopic image based on the parallax map from the parallax detection unit 22 and the attention region from the attention region estimation unit 21, and supplies the histogram to the stress value calculation unit 102.

Figure 13:
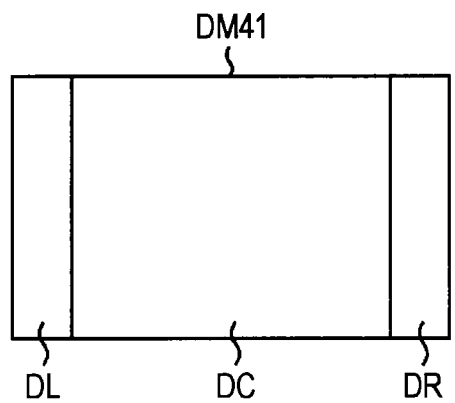
FIG. 13 is a diagram illustrating each region of the parallax map.

For example, if a parallax map DM41 shown in FIG. 13 is supplied, the histogram calculation unit 101, the histogram calculation unit 101 generates a parallax histogram of pixels for each region of the central region DC of the parallax map DM41, the region DL around the left end, and the region DR around the right end.

Here, the region DC is the same region as a central region on the stereoscopic image, and the region DL and the region DR are the same regions as regions of left and right image frame parts (left and right ends) of the stereoscopic image. In addition, hereinafter, the region DC, the region DL, and the region DR are respectively referred to as a central region DC, a left image frame region DL, and a right image frame region DR.

For example, if a histogram of the central region DC is generated, the histogram calculation unit 101 sequentially selects pixels in the central region DC on the parallax map DM41 as an attention pixel. If the attention pixel is a pixel outside the attention region, the histogram calculation unit 101 adds 1 to a frequency value of the histogram bin of to which a parallax of the attention pixel belongs, and, if the attention pixel is a pixel in the attention region, adds a predetermined weight value W (here, 1<W) to a frequency value of the histogram bin to which a parallax of the attention pixel belongs, thereby generating a histogram of the central region DC.

Figure 14:
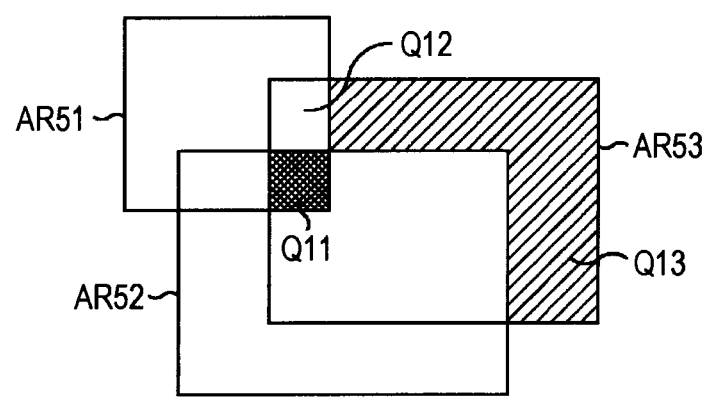
FIG. 14 is a diagram illustrating generation of the histogram.

In addition, when a histogram is generated, for example, as shown in FIG. 14, in a case where a plurality of attention regions AR51 to AR53 are detected, and several parts of the attention regions overlap each other, the greatest weight of the weights of the attention regions is used.

For example, it is assumed that weights W1 to W3 are respectively predefined for the attention regions AR51 to AR53. In this case, for example, if an attention pixel is located in a region Q11 where the attention regions AR51 to AR53 overlap each other, the greatest value of the weights W1 to W3 is added to a frequency value of the bin to which a parallax of the attention pixel belongs. Specifically, in a case where the weight W1 is the greatest of the weights W1 to W3, the weight W1 is added to a frequency value.

In addition, in a case where the attention pixel is located in a region Q12 where the attention region AR51 and the attention region AR53 overlap each other, a greater value of the weight W1 and the weight W3 is added to a frequency value of the bin to which a parallax of the attention pixel belongs. Further, in a case where the attention pixel is located in a region Q13 which does not overlap the other attention regions on the attention region AR53, the weight W3 is added to a frequency value of the bin to which a parallax of the attention pixel belongs.

Referring to the flowchart of FIG. 12 again, the histogram calculation unit 101 generates the histogram for each of the central region DC, the left image frame region DL, and the right image frame region DR, and supplies the histogram to the stress value calculation unit 102, and the flow proceeds to step S74.

In step S74, the stress value calculation unit 102 calculates a stress value based on the histogram supplied from the histogram calculation unit 101, and supplies the stress value to the shift amount calculation unit 103.

For example, the stress value calculation unit 102 records a stress function in advance for each region of the central region DC, the left image frame region DL, and the right image frame region DR. Here, the stress function is a function indicating a relationship between a parallax of the stereoscopic image and stress of a user when viewing the stereoscopic image.

Figure 15:
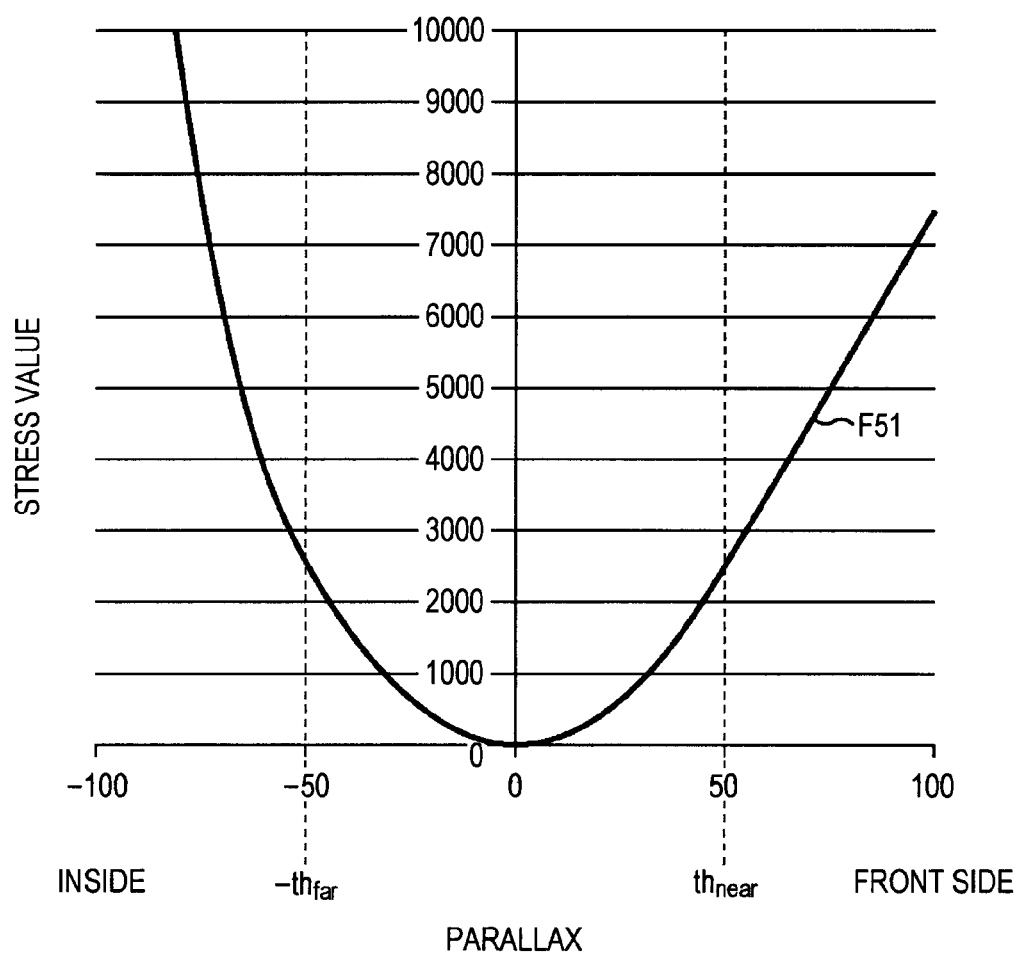
FIG. 15 is a diagram illustrating an example of the stress function.

Specifically, a stress function stress_func(d) of the central region DC is a function indicated by a curve F51 in FIG. 15. In addition, in FIG. 15, the transverse axis indicates a parallax, and the longitudinal axis indicates a stress value. In addition, parallax values $-th_{far}$ and $th_{near}$ are values calculated in advance in the allowable parallax range.

The stress function stress_func(d) indicated by the curve F51 is a fourth-order function in the section where the parallax d is smaller than $-th_{far}$, is a second-order function in the section where the parallax d is equal to or more than $-th_{far}$ and equal to or less than $th_{near}$, and is a first-order function in the section where the parallax d is greater than $th_{near}$.

The stress function stress_func(d) is expressed by the following Expression (7).

[Expression 7]

$$\text{stress\_func}(d) = \frac{d^4}{2th_{far}^2} + \frac{th_{far}^2}{2} \quad \text{when } d < -th_{far} \quad (7)$$

$$\text{stress\_func}(d) = d^2 \quad \text{when } -th_{far} \leq d \leq th_{near}$$

$$\text{stress\_func}(d) = 2th_{near} \cdot d - th_{near}^2 \quad \text{when } th_{near} < d$$

Figure 16:
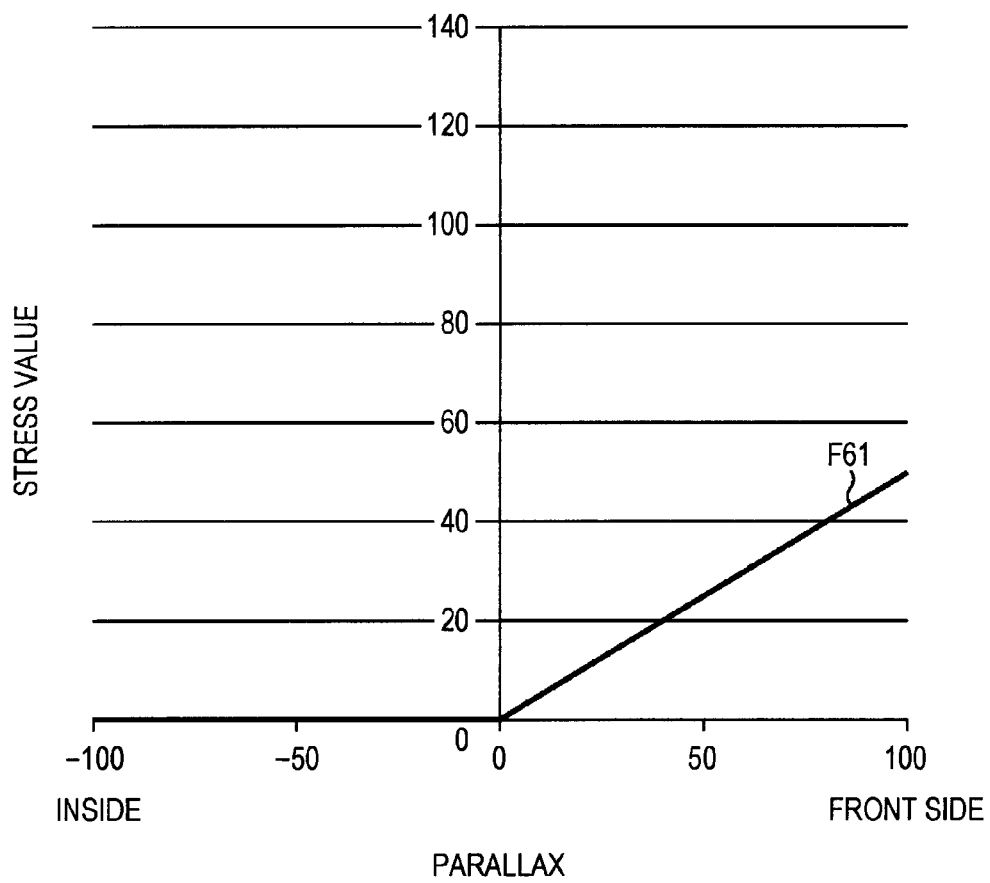
FIG. 16 is a diagram illustrating an example of the stress function.

In addition, a stress function stress_func_border(d) of the left image frame region DL and the right image frame region DR is a function indicated by a bent line F61 in FIG. 16. In addition, in FIG. 16, the transverse axis indicates a parallax, and the longitudinal axis indicates a stress value.

The stress function stress_func_border(d) indicated by the bent line F61 is 0 in the section where the parallax d is less than 0, and is a first-order function in the section where the parallax d is equal to or more than 0.

The stress function stress_func_border(d) is expressed by the following Expression (8).

[Expression 8]

$$\text{stress\_func\_border}(d) = 0 \quad \text{when } d < 0 \quad (8)$$

$$\text{stress\_func\_border}(d) = \frac{d}{2} \cdot \text{BORDER\_RATIO} \quad \text{when } d \geq 0$$

In addition, in Expression (8), BORDER_RATIO denotes a weight for the left image frame region DL and the right image frame region DR, and the larger the weight BORDER_RATIO is, the higher a contribution ratio of the left image frame region DL and the right image frame region DR to the calculation of a stress value is. In addition, in the stress function stress_func_border(d) indicated by the bent line F61 of FIG. 16, the weight BORDER_RATIO is 1.

The stress value calculation unit 102 computes the following Expression (9) based on the stress function stress_func(d) of the central region DC, the stress function stress_func_border(d) of the left image frame region DL and the right image frame region DR, and the histogram for each region, and calculates a stress value stress(s) for a shift amount s.

[Expression 9]

$$stress(s) = \sum_{d=VX\_MIN}^{VX\_MAX} stress\_func(d-s) \cdot Hist_C(d) + \\ \sum_{d=VX\_MIM}^{VX\_MAX} stress\_func\_border(d-s) \cdot \{Hist_L(d) + Hist_R(d)\} \quad (9)$$

In addition, in Expression (9), $Hist_C(d)$ denotes a frequency value of the bin to which the parallax d belongs in the histogram of the central region DC. Further, $Hist_L(d)$ and $Hist_R(d)$ respectively denote a frequency value of the bin to which the parallax d belongs in the histograms of the left image frame region DL and the right image frame region DR. In Expression (9), a detection range of the parallax d is $VX\_MIN \leq d \leq VX\_MAX$.

Here, the first term of the right side of the stress value stress(s) in Expression (9) indicates a stress value of the central region DC. That is to say, for each parallax in a detection range in a case where parallax adjustment is performed by shifting a stereoscopic image by the shift amount s, a product between a stress value of the parallax and a frequency value of the parallax is obtained, a sum total of products obtained for the respective parallaxes is a final stress value of the central region DC.

In addition, the second term of the right side of the stress value stress(s) indicates a stress value of the left image frame region DL and the right image frame region DR. That is to say, for each parallax in a detection range in a case where parallax adjustment is performed by shifting a stereoscopic image by the shift amount s, a product between a stress value of the parallax and a frequency value of the histogram of the left image frame region DL and the right image frame region DR of the parallax is obtained. In addition, a sum total of products obtained for the respective parallaxes is a final stress value of the left and right image frame parts (the left image frame region DL and the right image frame region DR).

A sum of the stress value of the central region DC and the stress value of the left and right image frame parts obtained in this way is a stress value stress(s).

As such, when the stress value stress(s) is calculated, a stress value stress(s) of the entire stereoscopic image is calculated by adding a stress value of each pixel with the unit of each pixel of the stereoscopic image. Therefore, it is possible to perform a parallax control by putting emphasis on a dominant subject with a large area, that is, a main substrate.

In addition, even if some errors occur in the parallax distribution detection, it is possible to reduce the influence on the parallax control of a stereoscopic image. In addition, if the parallax control of a stereoscopic image is performed using the stress value stress(s), it is possible to perform a parallax control in consideration of the left and right image frame parts of a stereoscopic image.

In step S75, the shift amount calculation unit 103 calculates a shift amount s which minimizes the stress value stress(s) supplied from the stress value calculation unit 102 and supplies the shift amount to the image processing unit 104. In addition, the shift amount s is detected in the same range as the detection range of the parallax d, that is, in a range of $VX\_MIN \leq s \leq VX\_MAX$.

Specifically, the shift amount calculation unit 103 computes the following Expression (10) and obtains a shift amount s minimizing the stress value stress(s). In addition, when Expression (10) is computed, the shift amount calculation unit 103 initially obtains a stress value stress(0) in a case of s=0 assuming a case where a parallax distribution of the stereoscopic image is flat, and temporarily uses the obtained value as a shift amount s minimizing the stress value stress(s).

[Expression 10]

$$\min_{VX\_MIN \leq s \leq VX\_MAX} \left[ \begin{array}{l} \sum_{d=VX\_MIN}^{VX\_MAX} stress\_func(d-s) \cdot Hist_C(d) + \\ \sum_{d=VX\_MIM}^{VX\_MAX} stress\_func\_border(d-s) \cdot \\ \{Hist_L(d) + Hist_R(d)\} \end{array} \right] \quad (10)$$

In step S76, the image processing unit 104 generates a left eye image L' and a right eye image R' by shifting the supplied left eye image L and right eye image R based on the shift amount s from the shift amount calculation unit 103.

For example, the image processing unit 104 shifts the left eye image L in the parallax direction by −s/2 for generation of the left eye image L', and shifts the right eye image R in the parallax direction by s/2 for generation of the right eye image R', thereby performing parallax adjustment of the stereoscopic image. The image processing unit 104 outputs the stereoscopic image formed by the left eye image L' and the right eye image R' obtained in this way as a stereoscopic image where a parallax is adjusted, and the image conversion process finishes.

In this way, the image processing apparatus 91 generates a histogram by weighting an attention region for each region of the stereoscopic image, and obtains a stress value from the generated histogram and a stress function for each region. In addition, the image processing apparatus 91 shifts the stereoscopic image based on an appropriate shift amount obtained from the stress value, thereby performing parallax adjustment.

If a shift amount is calculated in consideration of an attention region as such, a more appropriate parallax control can be realized, and thus it is possible to make a subject of the attention region more easily viewed and to suppress fatigue of a user viewing the stereoscopic image to the minimum.

Figure 17:
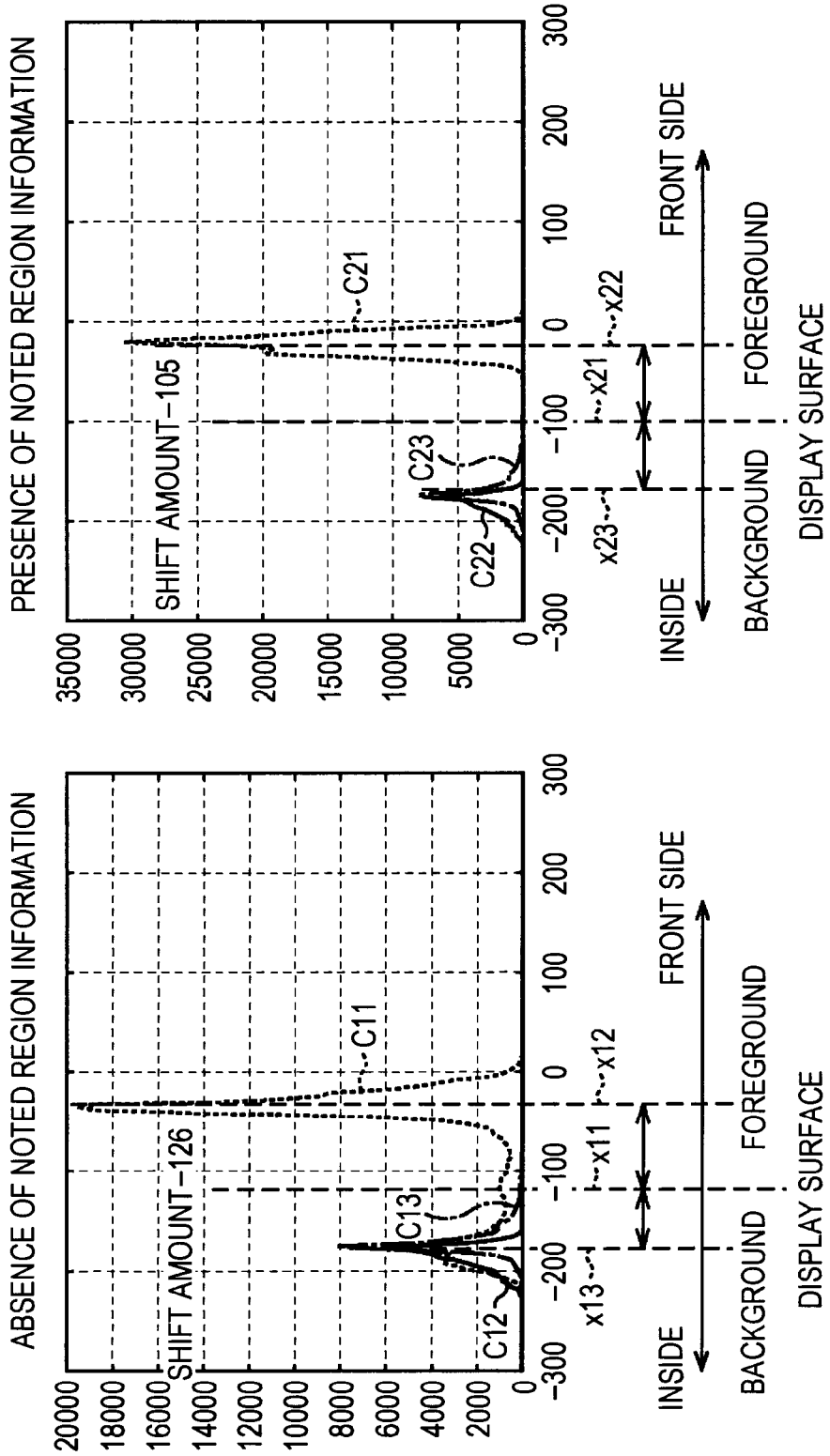
FIG. 17 is a diagram illustrating an effect of the parallax control considering an attention region.

Specifically, for example, as shown in FIG. 17, upon comparison between a parallax distribution of a stereoscopic image where parallax adjustment is performed taking no account of the attention region and a parallax distribution of a stereoscopic image where parallax adjustment is performed taking account of the attention region, it can be seen that a more appropriate parallax control is performed for one taking account of the attention region.

In addition, in FIG. 17, the left part of the figure shows a histogram indicating a parallax distribution of the stereoscopic image where the parallax adjustment is performed taking no account of the attention region, and the right part of the figure shows a histogram indicating a parallax distribution of the stereoscopic image where the parallax adjustment is performed taking account of the attention region. In addition, in each histogram, the transverse axis indicates a parallax, and the longitudinal axis indicates a frequency value for each parallax. Here, the parallax adjustment performed taking no account of the attention region refers to parallax adjustment of performing the image conversion process in FIG. 12 without weighting parallaxes of pixels of the attention region.

In the histogram shown in the left part of the figure, the curves C11 to C13 respectively indicate parallax distributions in the regions of the central region DC, the left image frame region DL, and the right image frame region DR of the stereoscopic image after the parallax adjustment.

In addition, X11 denotes a position of the display surface displaying the stereoscopic image, and X12 denotes a peak position of the curve C11, that is, a location of a foreground (main subject) on the stereoscopic image. Further, X13 denotes a peak position of a frequency value of a parallax of the image frame part defined from the curves C12 and C13, that is, a location of a background on the stereoscopic image.

As can be seen from the histogram of the left part of the figure, if a shift amount is obtained taking no account of the attention region, the main subject which is a foreground excessively protrudes toward a user, and the background is located around the display surface which thus leads to an insufficient sense of depth.

In contrast, the histogram shown in the right part of the figure is a histogram indicating parallax distributions of the stereoscopic image obtained through the parallax adjustment by the image processing apparatus 91. In the histogram, the curves C21 to C23 respectively indicate parallax distributions in the regions of the central region DC, the left image frame region DL, and the right image frame region DR of the stereoscopic image after the parallax adjustment.

In addition, X21 denotes a position of the display surface displaying the stereoscopic image, and X22 denotes a peak position of the curve C21, that is, a location of the foreground (main subject) on the stereoscopic image. Further, X23 denotes a location of the background on the stereoscopic image defined from the curves C22 and C23.

As can be seen from the histogram of the right part of the figure, if a shift amount is obtained taking account of the attention region, the main subject which is a foreground is suppressed from protruding toward a user, and the foreground and the background are positioned with balance.

In addition, although, in the above description, a case where the left eye image L and the right eye image R forming the stereoscopic image are processed using their original sizes and a shift amount s is calculated has be described, the left eye image L and the right eye image R may be reduced at a predetermined reduction ratio and then the shift amount s may be calculated. In this case, detection of an attention region or generation of a histogram is performed using the reduced left eye image L and right eye image R, and then a shift amount is calculated.

In addition, in this case, when parallax adjustment of the stereoscopic image is performed, the calculated shift amount is enlarged at a reciprocal of the reduction ratio of the left eye image L or the right eye image R and then is used for the parallax adjustment. That is to say, the left eye image L or the right eye image R is shifted based on the enlarged shift amount. If the stereoscopic image is reduced and then the shift amount is calculated in this way, it is possible to perform parallax adjustment more rapidly with a less process amount.

In addition, in the image processing apparatus 91, since a stress function for each region is changed, and thereby methods of controlling a parallax of the stereoscopic image can be freely changed, it is possible to realize a more appropriate parallax control depending on stereoscopic images or viewing conditions.

Fourth Embodiment
Configuration Example of Image Processing Apparatus

After the parallax adjustment is performed based on the above-described shift amount s, a left eye image L' and a right eye image R' may be generated by further performing the parallax adjustment using a conversion function.

Figure 18:
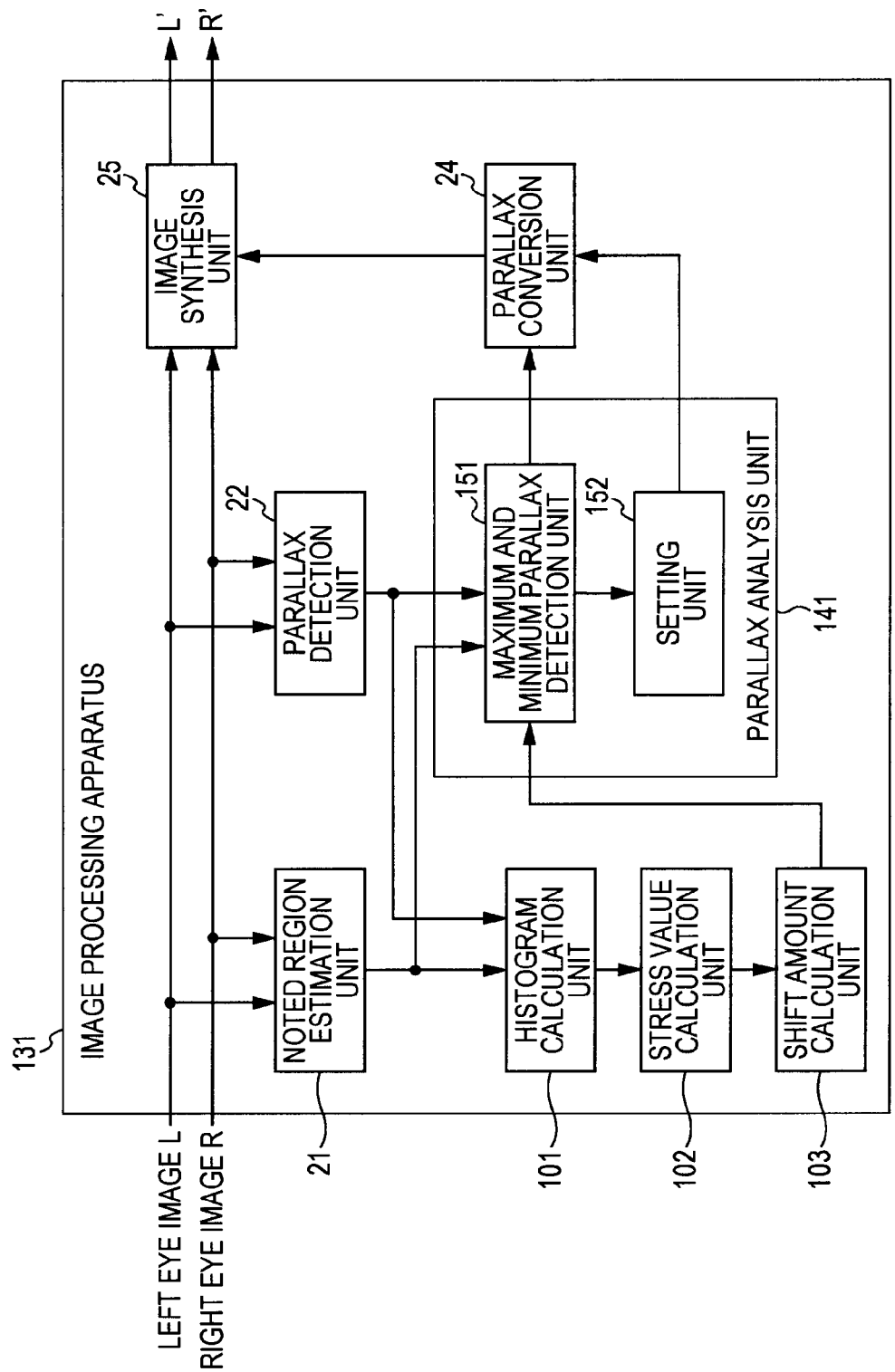
FIG. 18 is a diagram illustrating still another configuration example of the image processing apparatus.

In this case, an image processing apparatus is configured as shown in FIG. 18. In addition, in FIG. 18, parts corresponding to the case in FIG. 3 or FIG. 11 are given the same reference numerals, and description thereof will be appropriately omitted.

An image processing apparatus 131 in FIG. 18 includes an attention region estimation unit 21, a parallax detection unit 22, a histogram calculation unit 101, a stress value calculation unit 102, a shift amount calculation unit 103, a parallax analysis unit 141, a parallax conversion unit 24, and an image synthesis unit 25.

In the image processing apparatus 131, an estimation result of the attention region obtained by the attention region estimation unit 21 is supplied to the parallax analysis unit 141 and the histogram calculation unit 101. In addition, a parallax map obtained by the parallax detection unit 22 is also supplied to the parallax analysis unit 141 and the histogram calculation unit 101. Further, a shift amount obtained by the shift amount calculation unit 103 is supplied to the parallax analysis unit 141.

The parallax analysis unit 141 sets conversion characteristics based on the attention region from the attention region estimation unit 21, the parallax map from the parallax detection unit 22, and the shift amount from the shift amount calculation unit 103, and supplies the conversion characteristics to the parallax conversion unit 24. The parallax analysis unit 141 includes a maximum and minimum parallax detection portion 151 and a setting portion 152.

The maximum and minimum parallax detection portion 151 detects an attention parallax, a maximum parallax, and a minimum parallax by shifting a parallax of each pixel of the attention region from the attention region estimation unit 21 and the parallax map from the parallax detection unit 22 based on the shift amount from the shift amount calculation unit 103, for supply to the setting portion 152. In addition, the maximum and minimum parallax detection portion 151 supplies a parallax map corrected based on the shift amount to the parallax conversion unit 24.

The setting portion 152 sets conversion characteristics based on the attention parallax, the maximum parallax, and the minimum parallax supplied from the maximum and minimum parallax detection portion 151, and supplies the conversion characteristics to the parallax conversion unit 24.

Description of Image Conversion Process

Figure 19:
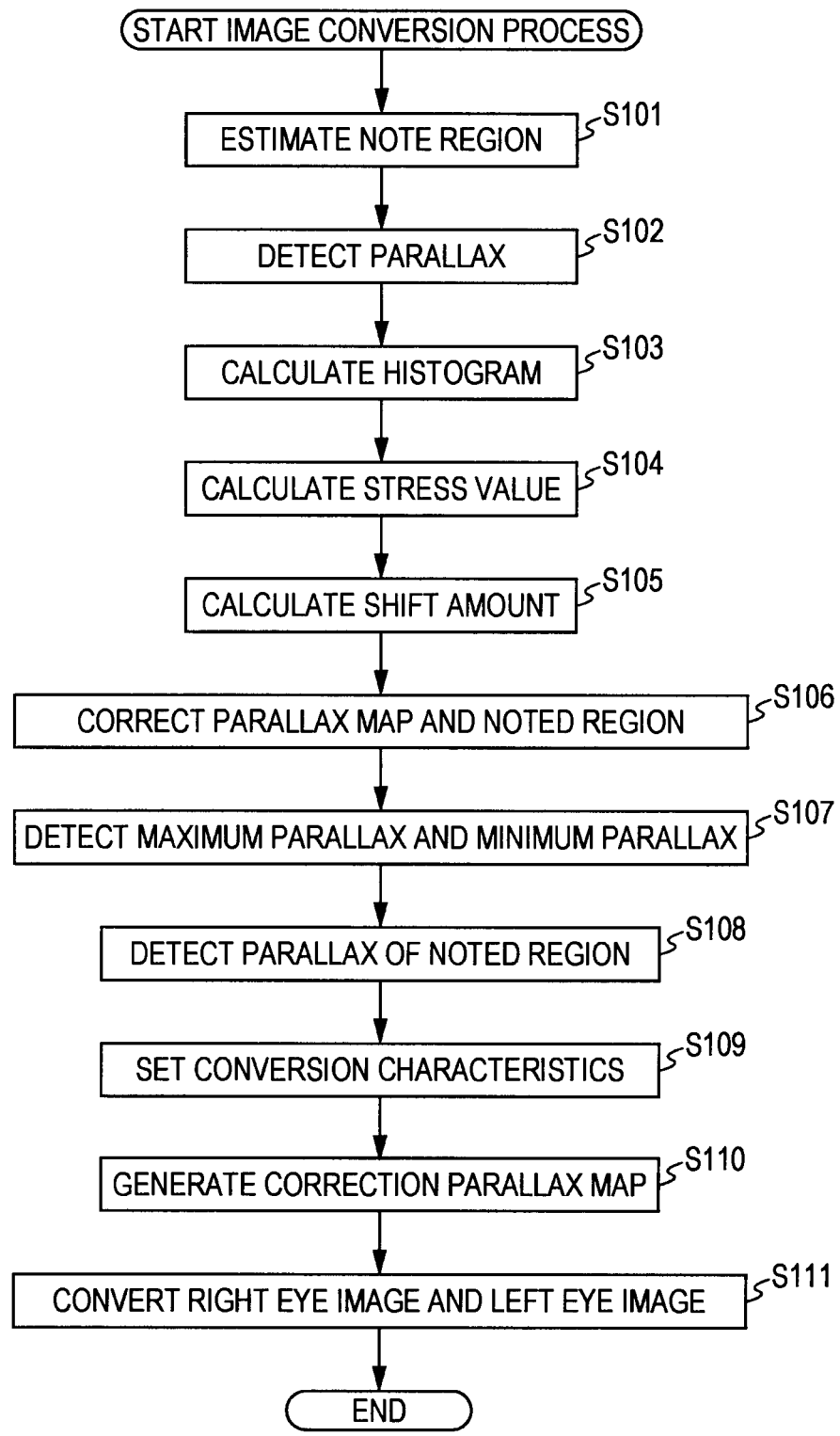
FIG. 19 is a flowchart illustrating an image conversion process.

Next, an image conversion process performed by the image processing apparatus 131 will be described with reference to the flowchart of FIG. 19. In addition, the processes in steps S101 and S102 are the same as the processes in steps S11 and S12 of FIG. 4, and thus description thereof will be omitted. Here, the attention region obtained in step D101 and the parallax map obtained in step S102 are supplied to the histogram calculation unit 101 and the maximum and minimum parallax detection portion 151.

In step S103, the histogram calculation unit 101 generates histograms of the central region DC, the left image frame region DL, and the right image frame region DR based on the attention region from the attention region estimation unit 21 and the parallax map from the parallax detection unit 22, and supplies the histograms to the stress value calculation unit 102.

The histogram for each region is generated, and, thereafter, a shift amount is calculated through processes in steps S104 and S105. These processes are the same as the processes in steps S74 and S75 of FIG. 12, and thus description thereof will be omitted. If a shift amount is calculated in step S105, the shift amount calculation unit 103 supplies the calculated shift amount to the maximum and minimum parallax detection portion 151.

In step S106, the maximum and minimum parallax detection portion 151 corrects a position of the attention region from the attention region estimation unit 21 and the parallax map from the parallax detection unit 22 based on the shift amount s supplied from the shift amount calculation unit 103. For example, a position of the attention region is shifted (moved in parallel) by the shift amount s, and the shift amount s is added to a pixel value (parallax) of each pixel of the parallax map, for generation of a corrected parallax map. In addition, the maximum and minimum parallax detection portion 151 supplies the parallax map corrected based on the shift amount s to the parallax conversion unit 24.

The attention region and the parallax map are corrected, and, thereafter, the image conversion process finishes through processes in steps S107 to S111. The processes are the same as the processes in steps S13 to S17 of FIG. 4, and thus description thereof will be omitted.

However, in steps S107 and S108, a parallax of the attention region, a maximum parallax, and a minimum parallax are obtained based on the corrected attention region and parallax map. In addition, in step S110, the parallax conversion unit 24 converts the parallax map after being corrected which is supplied from the maximum and minimum parallax detection portion 151 into a corrected parallax map using the conversion function from the setting portion 152, and supplies the corrected parallax map to the image synthesis unit 25. In addition, the parallax conversion unit 24 obtains a parallax map before being corrected from the maximum and minimum parallax detection portion 151 as necessary, for supply to the image synthesis unit 25.

Figure 20:
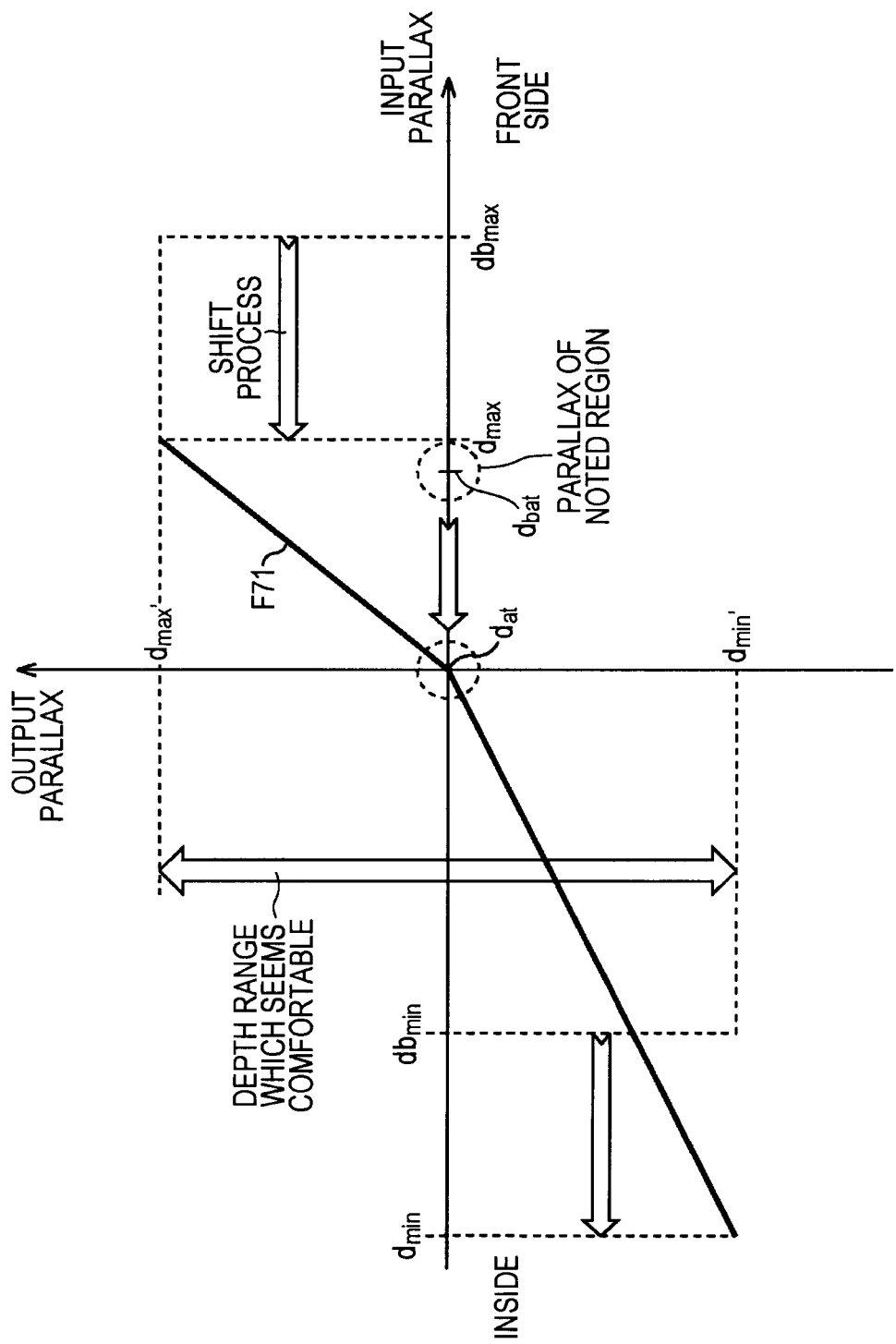
FIG. 20 is a diagram illustrating an example of the conversion function.

In addition, since the parallax map or the attention region is corrected based on the shift amount s in the image processing apparatus 131, a conversion function is shifted through the correction, for example, as shown in FIG. 20. In addition, in FIG. 20, the transverse axis indicates a parallax $d_i$ of each pixel on the parallax map, and the longitudinal axis indicates a corrected parallax $d_o$. A bent line F71 in the figure indicates a graph of the conversion function.

For example, if a maximum parallax, an attention parallax, and a minimum parallax in the parallax map after being corrected is $db_{max}$, $db_{at}$ and $db_{min}$, the parallaxes are shifted to $d_{max}$, $d_{at}$, and $d_{min}$ through correction of the attention region and the parallax map based on the shift amount s. In addition, after the shift is performed, a conversion function is set in which a parallax of each pixel on the parallax map is a parallax in the allowable parallax range, and the attention parallax $d_{at}$ is converted into 0. In the example shown in FIG. 20, the attention parallax $d_{at}$ is 0, and, thus, the attention parallax $d_{at}$ is converted into the corrected parallax $d_o=0$ in the nonlinear conversion function indicated by the bent line F71.

As described above, the image processing apparatus 131 calculates a shift amount s by generating the histogram for each region, corrects the attention region and the parallax map based on the shift amount s, then sets the conversion function, and generates the corrected parallax map.

As such, if the parallax map and the attention region are corrected based on the shift amount s, it is possible to make a parallax of the corrected attention region almost 0. In addition, if a conversion function is set from the parallax map and the attention region corrected in this way, it is possible to convert a parallax of each pixel of the stereoscopic image into a parallax in an appropriate parallax range and to thereby perform a more appropriate parallax control.

Fifth Embodiment

Configuration Example of Image Processing Apparatus

In a case where the parallax map is converted into a corrected parallax map using a conversion function, and parallax adjustment of the stereoscopic image is performed using the corrected parallax map, the attention region or the conversion function may be smoothened taking account of time variations in the attention region or the conversion function.

Figure 21:
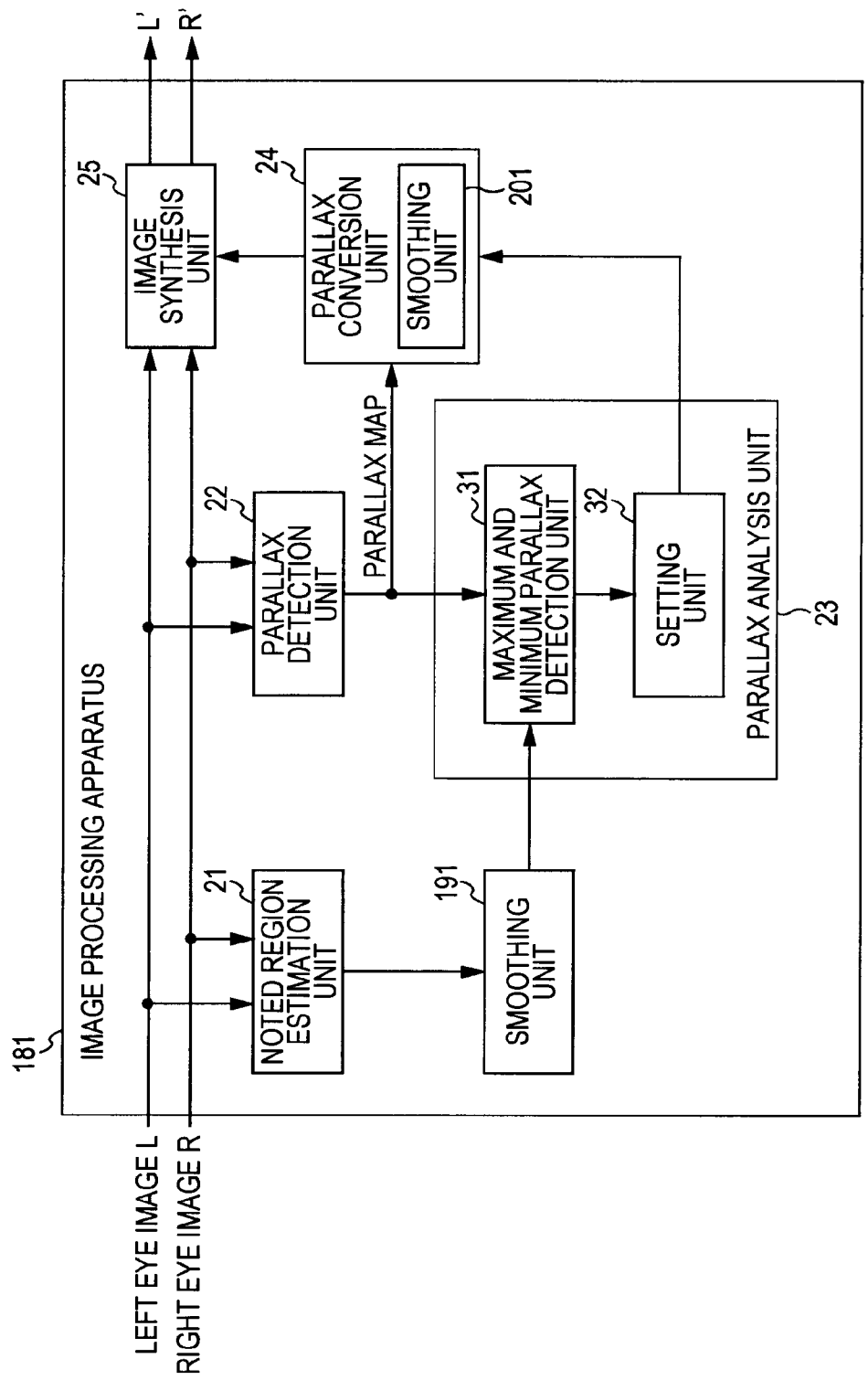
FIG. 21 is a diagram illustrating still another configuration example of the image processing apparatus.

In this case, an image processing apparatus is configured, for example, as shown in FIG. 21. In addition, in FIG. 21, parts corresponding to the case in FIG. 3 are given the same reference numerals, and description thereof will be appropriately omitted.

The image processing apparatus 181 in FIG. 21 includes an attention region estimation unit 21, a smoothening unit 191, a parallax detection unit 22, a parallax analysis unit 23, a parallax conversion unit 24, and an image synthesis unit 25. The image processing apparatus 181 is different from the image processing apparatus 11 in FIG. 3 in that the smoothening unit 191 is newly provided, and a smoothening portion 201 is provided in the parallax conversion unit 24, and the remaining configuration is the same as the configuration of the image processing apparatus 11.

The smoothening unit 191 holds the attention region supplied from the attention region estimation unit 21 for a specific period, smoothens the held attention region, and supplies the smoothened attention region to the maximum and minimum parallax detection portion 31.

In addition, the smoothening portion 201 provided in the parallax conversion unit 24 holds a conversion table generated based on the conversion function supplied from the parallax analysis unit 23, and smoothens the held conversion table. The parallax conversion unit 24 converts the parallax map into a corrected parallax map using the conversion table smoothened by the smoothening portion 201.

Description of Image Conversion Process

Figure 22:
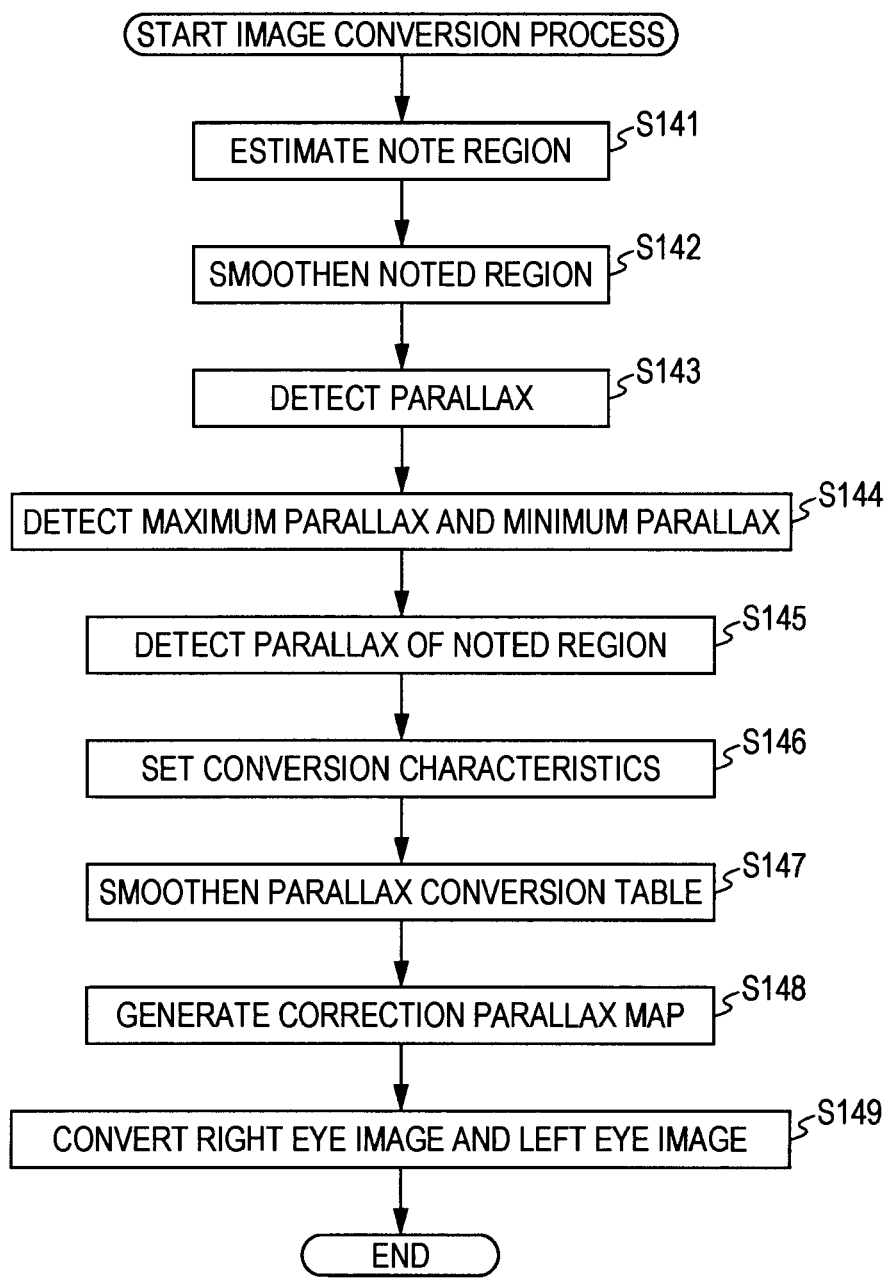
FIG. 22 is a flowchart illustrating an image conversion process.

Next, an image conversion process performed by the image processing apparatus 181 will be described with reference to the flowchart of FIG. 22.

In step S141, the attention region estimation unit 21 estimates an attention region based on the supplied left eye image L and right eye image R, and supplies the estimation result to the smoothening unit 191. In addition, in step S141, the same process as in step S11 of FIG. 4 is performed.

In step S142, the smoothening unit 191 smoothens the attention region using several attention regions which were supplied from the attention region estimation unit 21 in the past and the attention region supplied from the attention region estimation unit 21 this time, and supplies the smoothened attention region to the maximum and minimum parallax detection portion 31.

Figure 23:
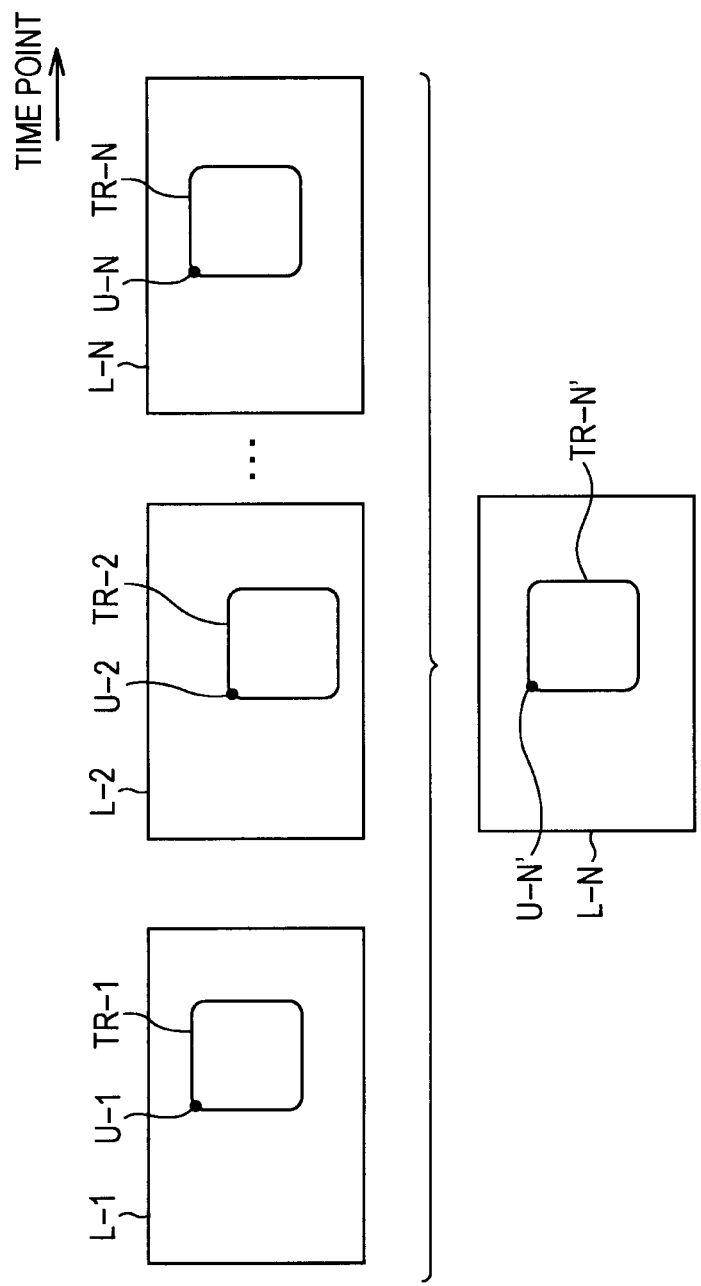
FIG. 23 is a diagram illustrating smoothening of the attention region.

For example, as shown in FIG. 23, it is assumed that attention regions TR-1 to TR-N on left eye images L-1 to L-N of continuous N frames including a current frame are smoothened, and an attention region TR-N' obtained as a result thereof is an attention region of the left eye image L-N of the current frame.

Here, it is assumed that the left eye images L-1 to L-(N−1) (here, the left eye images L-3 to L-(N−1) are not shown) are left eye images of the past frames. In this case, the smoothening unit 191 applies a filter process for coordinates of the respective vertices of the rectangular attention regions TR-1 to TR-N, and uses coordinates obtained as a result thereof as coordinates of the respective vertices of the attention region TR-N' after being smoothened.

Therefore, for example, the filter process is performed using vertices U-1 to U-N which are top left vertices of the attention regions TR-1 to TR-N, and a coordinate obtained as a result thereof is a coordinate of the top left vertex U-N' of the attention region TR-N' of the current frame.

Here, the smoothening is performed using an average value, a rule of majority, a filter process using an IIR (Infinite Impulse Response) filter, or the like. Therefore, for example, in a case where the smoothening is performed using an average value, an average value of coordinates of the vertices U-1 to U-N is used as a coordinate of the vertex U-N'.

As such, if the attention region is smoothened, time variations in the attention region are suppressed, and thus it is possible to perform a stable parallax control. In other words, it is possible to suppress a parallax on the stereoscopic image from being steeply varied.

Referring to the flowchart of FIG. 22 again, the attention region is smoothened, and, then, processes in step S143 to S146 are performed. The processes are the same as the processes in steps S12 to S15 of FIG. 4, and thus description thereof will be appropriately omitted. However, in step S145, a parallax of the attention region is detected based on the smoothened attention region.

If the conversion function (conversion characteristics) of the stereoscopic image of the current frame is set by the setting portion 32, the parallax conversion unit 24 generates a conversion table based on the conversion function supplied from the setting portion 32. The conversion table is a table where the parallax $d_i$ and the parallax $d_o$ which are input and output of the conversion function are recorded so as to be correlated with each other.

In step S147, the smoothening portion 201 smoothens the conversion table using the conversion table of the current frame generated by the parallax conversion unit 24 and recorded conversion tables of several frames in the past.

For example, a filter process is performed using a corrected parallax $d_o$ correlated with the same parallax $d_i$ in such a conversion table, and a corrected parallax obtained as a result thereof is a corrected parallax corresponding to the parallax $d_i$ in a conversion table of the current frame after being smoothened. The smoothening of the conversion table is also performed using, for example, an average value, a rule of majority, a filter process using an IIR filter, or the like.

Figure 24:
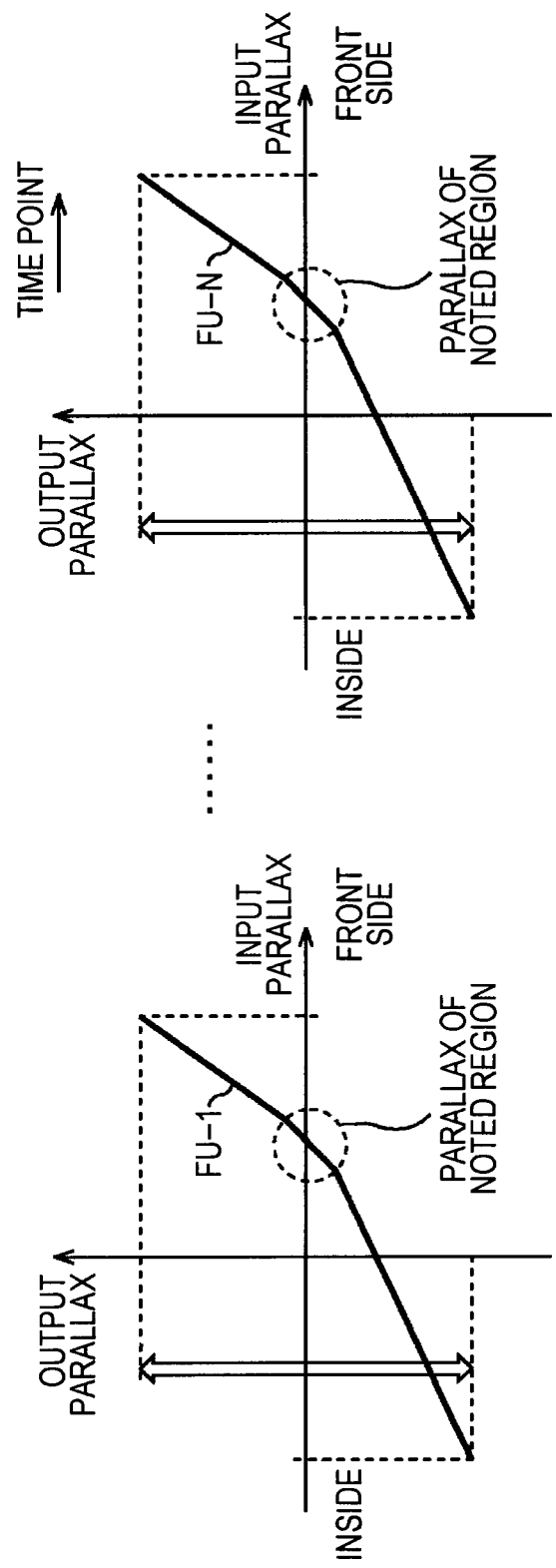
FIG. 24 is a diagram illustrating smoothening of the conversion function.

The smoothening of the conversion table is equivalent to smoothening of a conversion function of a plurality of continuous frames, for example, as shown in FIG. 24. In addition, in FIG. 24, each of bent lines FU-1 to FU-N (here, the bent lines FU-2 to FU-(N−1) are not shown) indicates a conversion function of each frame. In addition, in the graph of the conversion function, the transverse axis indicates a parallax $d_i$, and the longitudinal axis indicates a corrected parallax $d_o$.

As such, if the conversion table is smoothened, time variations in the parallax conversion characteristics are suppressed, and thus it is possible to perform a stable parallax control. In other words, it is possible to suppress a parallax on the stereoscopic image from being steeply varied.

Referring to the flowchart of FIG. 22 again, the conversion table is smoothened, and, then, the image conversion process finishes through processes in steps S148 and S149. In addition, the processes are the same as the processes in steps S16 and S17 of FIG. 4, and thus description thereof will be omitted. However, in step S148, the parallax map is converted into a corrected parallax map using the conversion table obtained through the smoothening.

As described above, the image processing apparatus 181 generates the corrected parallax map and adjusts a parallax of the stereoscopic image by smoothening the attention region and the conversion table. Thereby, it is possible to perform a more appropriate and stable parallax control.

In addition, although a case where both the attention region and the conversion table are smoothened has been described as an example in the embodiment, only one of the attention region and the conversion table may be smoothened. Further, the attention region or the conversion table may be also smoothened in the above-described second to fourth embodiments.

Sixth Embodiment

Configuration Example of Image Processing Apparatus

Although, in the above description, a case where an attention region is estimated and a parallax control is performed taking account of the attention region has been described as an example, scene recognition of a stereoscopic image may be performed, and the recognition result may be used for the parallax control.

Figure 25:
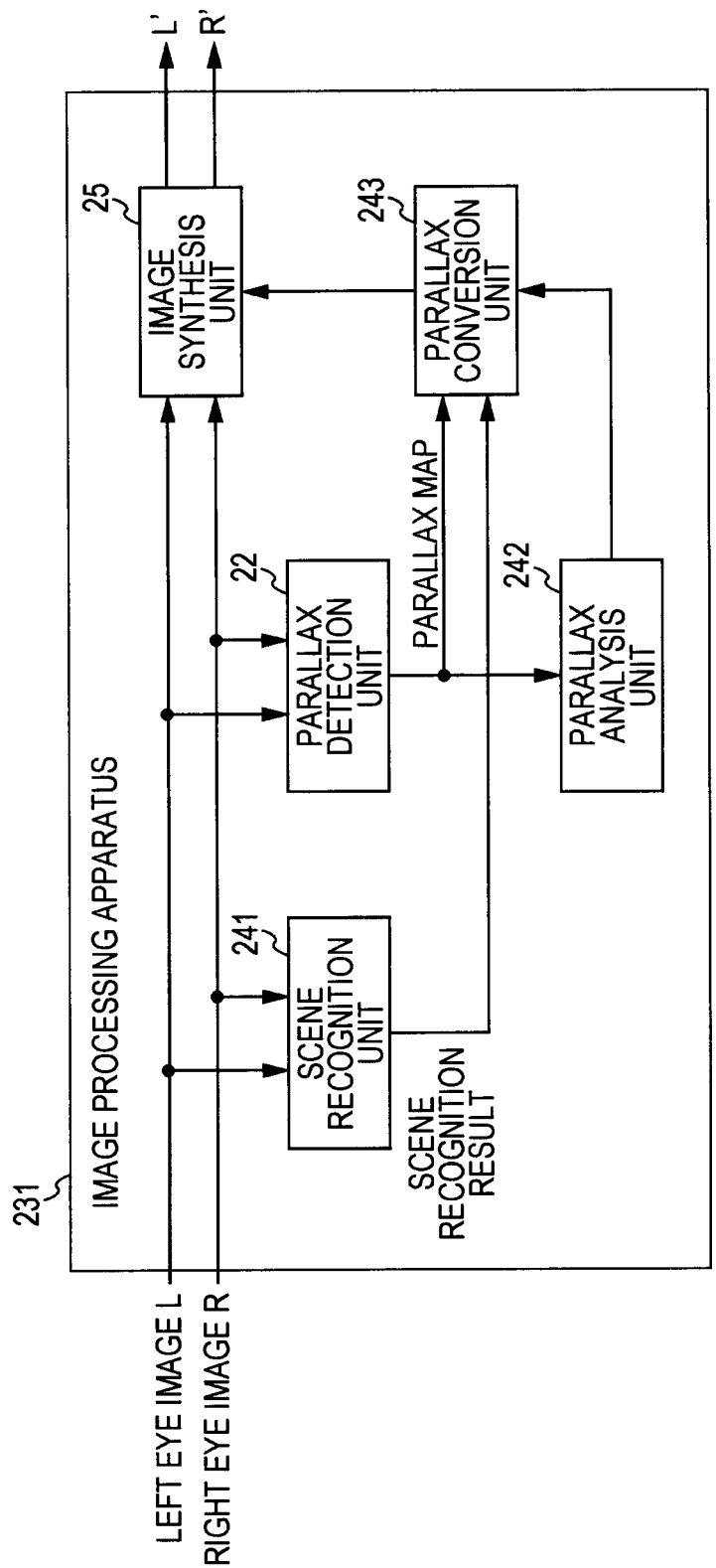
FIG. 25 is a diagram illustrating still another configuration example of the image processing apparatus.

In this case, an image processing apparatus is configured as shown in FIG. 25. In addition, in FIG. 25, parts corresponding to the case in FIG. 3 are given the same reference numerals, and description thereof will be appropriately omitted.

An image processing apparatus 231 in FIG. 25 includes a scene recognition unit 241, a parallax detection unit 22, a parallax analysis unit 242, parallax conversion unit 243, and an image synthesis unit 25.

The scene recognition unit 241 performs scene recognition for at least one of the supplied left eye image L and right eye image R, and supplies the recognition result to the parallax conversion unit 243. In addition, the parallax detection unit 22 generates a parallax map from the supplied left eye image L and right eye image R, and supplies the parallax map to the parallax analysis unit 242 and the parallax conversion unit 243.

The parallax analysis unit 242 sets a conversion function (conversion characteristics) based on the parallax map from the parallax detection unit 22, and supplies the conversion function to the parallax conversion unit 243. The parallax conversion unit 243 generates a corrected parallax map based on the scene recognition result from the scene recognition unit 241, the parallax map from the parallax detection unit 22, and the conversion function from the parallax analysis unit 242, for supply to the image synthesis unit 25.

Configuration Example of Parallax Conversion Unit

Figure 26:
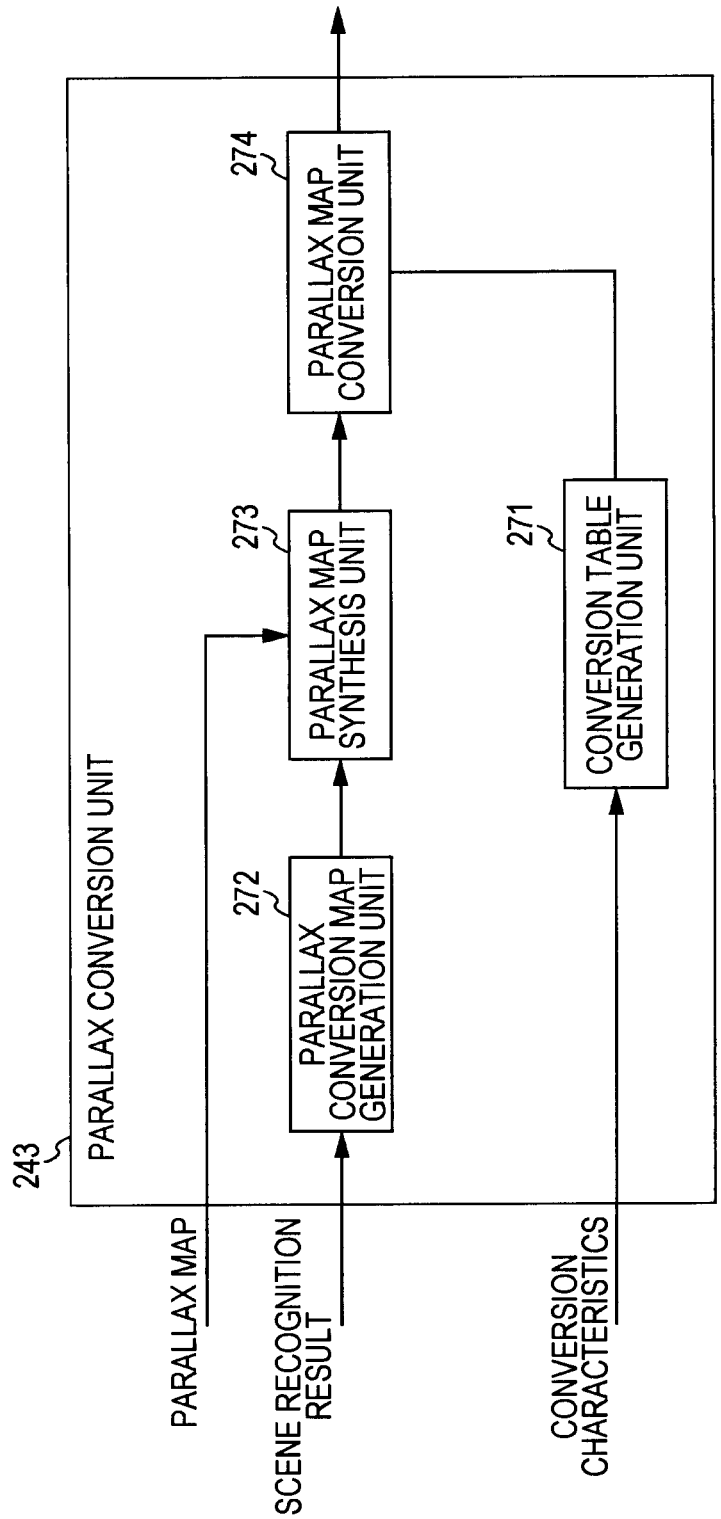
FIG. 26 is a diagram illustrating a configuration example of a parallax conversion unit.

In addition, the parallax conversion unit 243 in FIG. 25 is configured as shown in FIG. 26. In other words, the parallax conversion unit 243 includes a conversion table generation portion 271, a parallax conversion map generation portion 272, a parallax map synthesis portion 273, and a parallax map conversion portion 274.

The conversion table generation portion 271 generates a conversion table based on the conversion function supplied from the parallax analysis unit 242, and supplies the conversion table to the parallax map conversion portion 274. The parallax conversion map generation portion 272 generates a parallax conversion map based on the scene recognition result from the scene recognition unit 241, and supplies the parallax conversion map to the parallax map synthesis portion 273. Here, the parallax conversion map is a map indicating corrected parallaxes for correcting the parallax map according to scenes of the stereoscopic image.

The parallax map synthesis portion 273 synthesizes the parallax map from the parallax detection unit 22 with the parallax conversion map from the parallax conversion map generation portion 272, and supplies the synthesized parallax map obtained as a result thereof to the parallax map conversion portion 274. The parallax map conversion portion 274 converts a parallax of each pixel of the synthesized parallax map from the parallax map synthesis portion 273 using the conversion table from the conversion table generation portion 271, and supplies the corrected parallax map obtained as a result thereof to the image synthesis unit 25.

Description of Image Conversion Process

Figure 27:
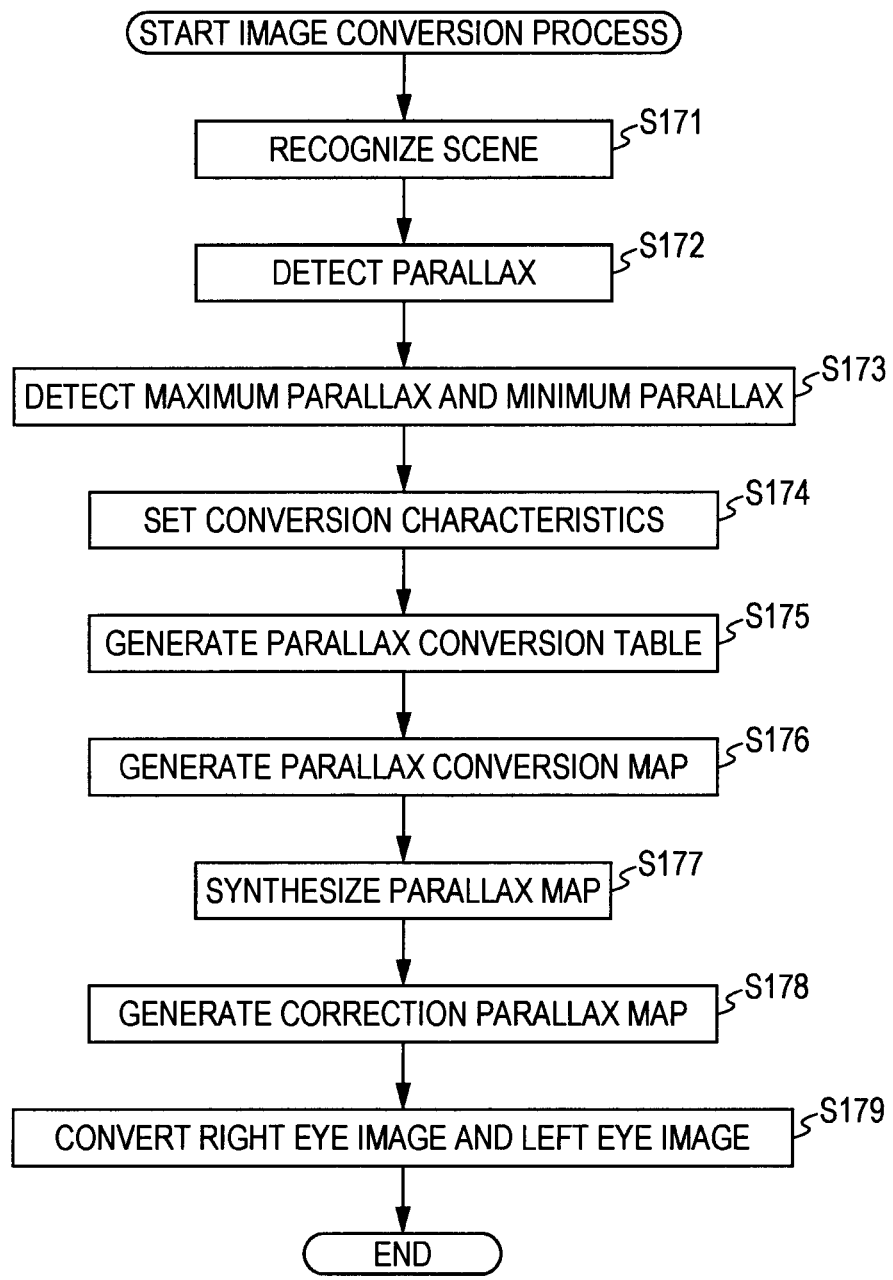
FIG. 27 is a flowchart illustrating an image conversion process.

Next, an image conversion process performed by the image processing apparatus 231 will be described with reference to the flowchart of FIG. 27.

In step S171, the scene recognition unit 241 performs scene recognition for at least one of the supplied left eye image L and right eye image R, and supplies the recognition result to the parallax conversion unit 243.

For example, the scene recognition unit 241 specifies an image of which scene of several scenes such as predefined "street", "landscape", "indoor", and "portrait" is the stereoscopic image, and uses information indicating the specified scene as a result of the scene recognition. Thereby, a scene in which the stereoscopic image is captured is specified.

In step S172, the parallax detection unit 22 detects a parallax of each pixel of the stereoscopic image based on the supplied left eye image L and right eye image R, and supplies the parallax map obtained as a result thereof to the parallax analysis unit 242 and the parallax conversion unit 243.

In step S173, the parallax analysis unit 242 detects a maximum parallax and a minimum parallax of the parallaxes of the pixels on the parallax map supplied from the parallax detection unit 22. In addition, in step S174, the parallax analysis unit 242 sets conversion characteristics (conversion function) such that a parallax of each pixel on the parallax map becomes a parallax in the allowable parallax range, based on the detected maximum parallax and minimum parallax, and the predefined allowable parallax range. Further, the parallax analysis unit 242 supplies the set conversion function to the conversion table generation portion 271.

In step S175, the conversion table generation portion 271 generates a conversion table based on the conversion function supplied from the parallax analysis unit 242, and supplies the conversion table to the parallax map conversion portion 274.

In step S176, the parallax conversion map generation portion 272 generates a parallax conversion map based on the scene recognition result supplied from the scene recognition unit 241, and supplies the parallax conversion map to the parallax map synthesis portion 273. More specifically, the parallax conversion map generation portion 272 records a parallax conversion map defined for each scene in advance, and selects a parallax conversion map for a scene indicated by the scene recognition result for supply to the parallax map synthesis portion 273.

In step S177, the parallax map synthesis portion 273 synthesizes the parallax map from the parallax detection unit 22 with the parallax conversion map from the parallax conversion map generation portion 272, and supplies the synthesized parallax map obtained as a result thereof to the parallax map conversion portion 274.

Figure 28:
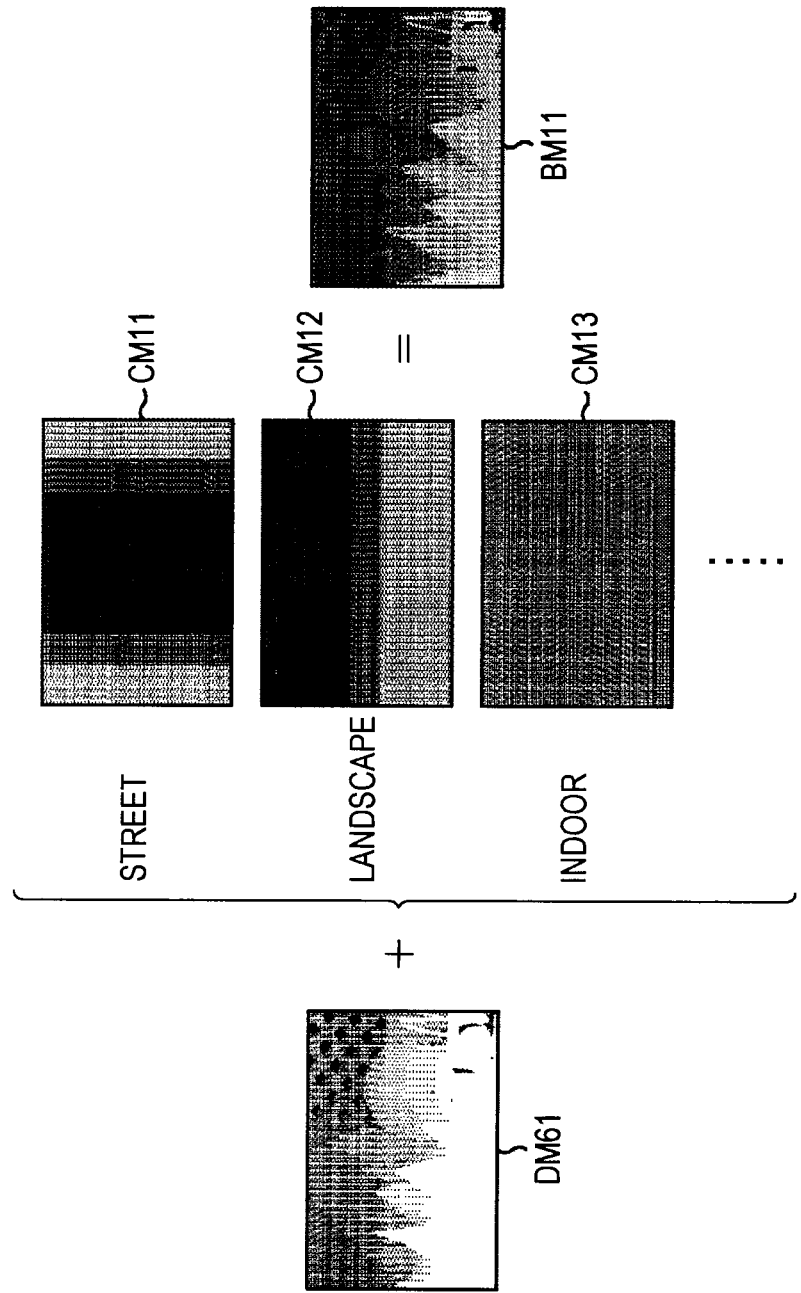
FIG. 28 is a diagram illustrating generation of the synthesis parallax map.

For example, as shown in FIG. 28, the parallax conversion map generation portion 272 records parallax conversion maps CM11 to CM13 for the respective scenes.

In the example shown in FIG. 28, the parallax conversion maps CM11 to CM13 respectively correspond to parallax conversion maps for the scenes of "street", "landscape" and "indoor".

For example, the parallax conversion map CM11 is a parallax conversion map of the "street" scene. Therefore, according to the parallax conversion map CM11, the parallax map is corrected such that a subject in the central part region of the stereoscopic image is positioned further on the depth side when viewed from a user, and subjects in regions around the ends of the stereoscopic image are positioned further on the front side when viewed from the user. For example, a pixel value (parallax) of each pixel of the central region of the parallax conversion map CM11 has a negative value, and a pixel value of each pixel of the regions around the ends thereof has a positive value.

Typically, in the street image, there are many cases where a road is located at the center of the image, and buildings at both sides of the roads are located in the regions around the ends of the images. Therefore, if a parallax of each pixel on the parallax map is corrected such that the road part is depressed inward, and the building part protrudes forward, it is possible to further emphasize a stereoscopic effect of the stereoscopic image.

In addition, the parallax conversion map CM12 is a parallax conversion map for the "landscape" scene. Therefore, according to the parallax conversion map CM12, the parallax map is corrected such that a subject in the upper region of the stereoscopic image in the figure is positioned further on the inner side, and a subject in the lower region of the stereoscopic image is positioned further on the front side.

Typically, in the landscape image, there are many cases where the sky is located on the upper side of the image, and other subjects are located on the lower part of the image. Therefore, if a parallax of each pixel on the parallax map is corrected such that the sky part located on the upper part of the image is depressed inward, and the other main subject part protrudes forward, it is possible to further emphasize a stereoscopic effect of the stereoscopic image.

In addition, the parallax conversion map CM13 is a parallax conversion map for the "indoor" scene. Therefore, in the parallax conversion map CM13, the entire stereoscopic image, that is, the entire parallax map is uniformly corrected. This is because, in the image captured indoors, a wall or the like occupies the background, and thus it is not necessary to particularly emphasize perspective in many cases.

The parallax conversion map generation portion 272 selects any one of the parallax conversion maps prepared in advance in this way. For example, if the "street" scene is recognized and the parallax conversion map CM11 is selected, the parallax map synthesis portion 273 synthesizes the parallax map DM61 with the parallax conversion map CM11, and uses the synthesized result as a synthesized parallax map BM11.

In other words, if a pixel to which attention is paid on the synthesized parallax map BM11 is an attention pixel, a sum of pixel values of pixels of the parallax map DM61 and the parallax conversion map CM11 located at the same position as the attention pixel is obtained, and a value of the obtained sum is used as a pixel value of the attention pixel.

Referring to the flowchart of FIG. 27 again, if the synthesized parallax map is generated, the flow proceeds to step S178 from step S177.

In step S178, the parallax map conversion portion 274 converts a parallax of each pixel of the synthesized parallax map from the parallax map synthesis portion 273 using the conversion table from the conversion table generation portion 271, and supplies a corrected parallax map obtained as a result thereof to the image synthesis unit 25. In addition, the parallax map conversion portion 274 obtains a parallax map from the parallax map synthesis portion 273 as necessary, and supplied the obtained parallax map to the image synthesis unit 25.

The corrected parallax map is generated, and, then, the image conversion process finishes through a process in step S179. The process is the same as the process in step S17 of FIG. 4, and thus description thereof will be omitted.

In this way, the image processing apparatus 231 performs scene recognition, corrects the parallax map according to the recognition result so as to generate a synthesized parallax map, and converts the synthesized parallax map into a corrected parallax map based on a conversion table, thereby performing image conversion of the stereoscopic image.

As such, the parallax map is corrected according to a result of the scene recognition, and thereby it is possible to appropriately emphasize of a parallax of the stereoscopic image according to a scene of the stereoscopic image. In other words, it is possible to perform a more appropriate parallax control.

Further, in the image processing apparatus 231 as well, an attention region of the stereoscopic image may be estimated and a conversion function may be set based on the estimation result, or a conversion function may be set using a scene recognition result.

For example, in a case where a conversion function is set using a scene recognition result, a parallax conversion map can be specified from the scene recognition result, and thus it is possible to specify a maximum parallax and a minimum parallax of the synthesized parallax map. Therefore, if a conversion function is set based on the maximum parallax and the minimum parallax of the synthesized parallax map such that a parallax of each pixel of the synthesized parallax map becomes a parallax in the allowable parallax range, it is possible to perform a more appropriate parallax control.

The above-described series of processes may be performed by hardware or software. When a series of processes is performed by the software, programs constituting the software are installed from a program recording medium to a computer which is built in dedicated hardware, or, for example, a general personal computer which can execute various kinds of functions by installing various kinds of programs.

Figure 29:
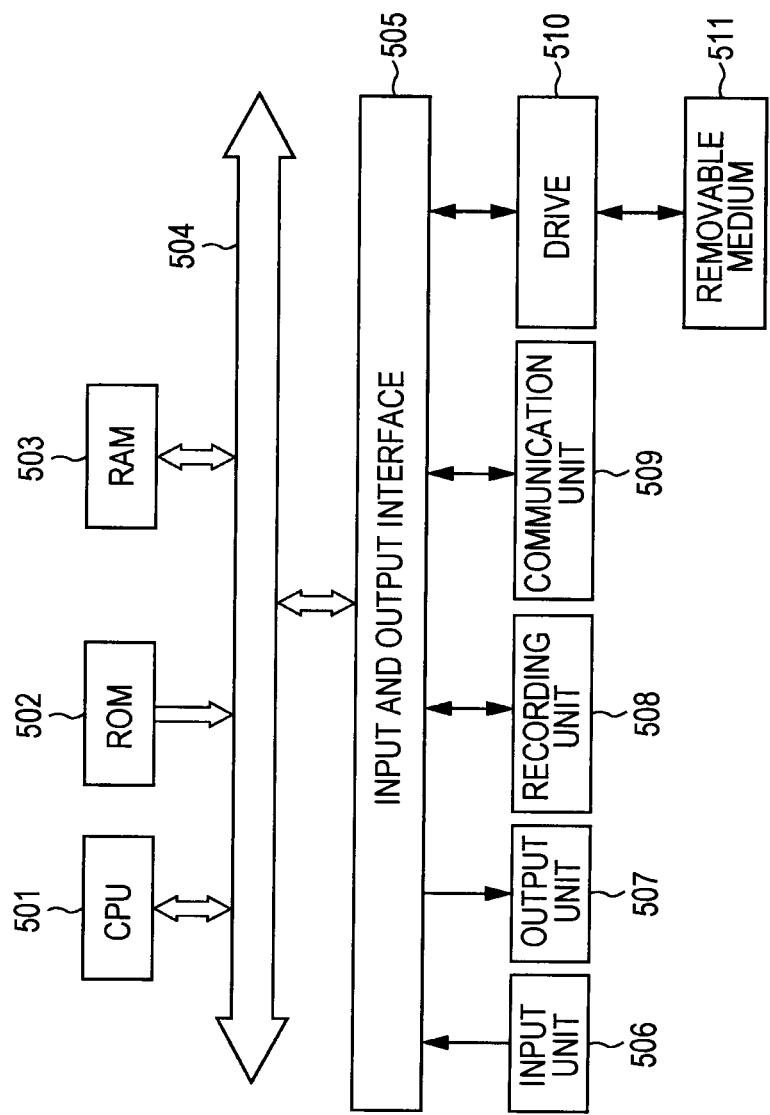
FIG. 29 is a diagram illustrating a configuration example of the computer.

FIG. 29 is a block diagram illustrating a hardware configuration example of a computer which executes the series of processes using a program.

In the computer, a CPU (Central Processing Unit) 501, a ROM (Read Only Memory) 502, and a RAM (Random Access Memory) 503 are connected to each other via a bus 504.

Also, the bus 504 is connected to an input and output interface 505. The input and output interface 505 is connected to an input unit 506 including a keyboard, a mouse, a microphone, and the like, an output unit 507 including a display, a speaker and the like, a storage unit 508 including a hard disc, a nonvolatile memory and the like, a communication unit 509 including a network interface and the like, and a drive 510 which drives a removal medium 511 such as a magnetic disc, an optical disc, a magnetic optical disc, or a semiconductor memory.

In the computer configured in this way, the CPU 501 loads, for example, a program stored in the storage unit 508 to the RAM 503 via the input and output interface 505 and the bus 504 for execution, thereby performing the series of processes.

The program executed by the computer (the CPU 501) is recorded in the removable medium 511 which is a package medium including a magnetic disc (including a flexible disc), an optical disc (including CD-ROM (Compact Disc-Read Only Memory) and DVD (Digital Versatile Disc)), a magnetic optical disc, a semiconductor memory, or the like, or is provided using a wired or wireless communication medium such as a LAN, the Internet, or digital satellite broadcasting.

The program can be installed in the storage unit 508 via the input and output interface 505 by mounting the removable medium 511 in the drive 510. In addition, the program may be received using the communication unit 509 via a wired or wireless transmission medium and be installed in the storage unit 508. Further, the program may be installed in the ROM 502 or the storage unit 508 in advance.

The program executed by the computer may be a program where processes are performed in a time series according to the order described in this specification, or may be a program executed in parallel therewith or a program where processes are performed at a necessary timing such as when accessed.

The present disclosure may employ the following configurations.

[1] An image processing apparatus including an attention region estimation unit that estimates an attention region which is estimated as a user paying attention thereto on a stereoscopic image; a parallax detection unit that detects a parallax of the stereoscopic image and generates a parallax map indicating a parallax of each region of the stereoscopic image; a setting unit that sets conversion characteristics for correcting a parallax of the stereoscopic image based on the attention region and the parallax map; and a parallax conversion unit that corrects the parallax map based on the conversion characteristics.

[2] The image processing apparatus set forth in [1], further including an image synthesis unit that corrects a parallax of the stereoscopic image based on the corrected parallax map.

[3] The image processing apparatus set forth in [1] or [2], further including a maximum and minimum parallax detection unit that detects a maximum value and a minimum value of parallaxes indicated by the parallax map and detects a parallax of the attention region based on the parallax map and the attention region, wherein the setting unit sets the conversion characteristics based on the maximum value, the minimum value, and the parallax of the attention region.

[4] The image processing apparatus set forth in [3], wherein the setting unit sets the conversion characteristics such that the parallax of the attention region is converted into a parallax with a predetermined size set in advance.

[5] The image processing apparatus set forth in any one of [1] to [4], wherein the setting unit sets different conversion characteristics for the attention region on the stereoscopic image and regions other than the attention region on the stereoscopic image.

[6] The image processing apparatus set forth in [5], wherein the setting unit sets the conversion characteristics of the attention region on the stereoscopic image such that a parallax is linearly converted in a predetermined parallax section including the parallax of the attention region.

[7] The image processing apparatus set forth in any one of [1] to [6], further including a smoothening unit that smoothens the attention region or the conversion characteristics.

The present disclosure contains subject matter related to that disclosed in Japanese Priority Patent Application JP 2011-128101 filed in the Japan Patent Office on Jun. 8, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
an attention region estimation unit that estimates an attention region which is estimated as a user paying attention thereto on a stereoscopic image;
a parallax detection unit that detects a parallax of the stereoscopic image and generates a parallax map indicating a parallax of each region of the stereoscopic image;

a maximum and minimum parallax detection unit that detects a maximum value and a minimum value of parallaxes indicated by the parallax map and detects a parallax of the attention region based on the parallax map and the attention region;

a setting unit that sets conversion characteristics for correcting a parallax of the stereoscopic image based on the attention region and the parallax map;

a parallax conversion unit that corrects the parallax map based on the conversion characteristics; and an image synthesis unit that corrects a parallax of the stereoscopic image based on the corrected parallax map, wherein the setting unit sets the conversion characteristics based also on the maximum value, the minimum value, and the parallax of the attention region, and wherein the attention region estimation unit, the parallax detection unit, the setting unit, the parallax conversion unit, the image synthesis unit, and the maximum and minimum parallax detection unit are each implemented via at least one processor.

2. The image processing apparatus according to claim 1, wherein the setting unit sets the conversion characteristics such that the parallax of the attention region is converted into a parallax with a predetermined size set in advance.

3. The image processing apparatus according to claim 2, wherein the setting unit sets different conversion characteristics for the attention region on the stereoscopic image and regions other than the attention region on the stereoscopic image.

4. The image processing apparatus according to claim 3, wherein the setting unit sets the conversion characteristics of the attention region on the stereoscopic image such that a parallax is linearly converted in a predetermined parallax section including the parallax of the attention region.

5. The image processing apparatus according to claim 4, further comprising a smoothening unit that smoothens the attention region or the conversion characteristics, wherein the smoothening unit is implemented via at least one processor.

6. An image processing method comprising:

estimating an attention region which is estimated as a user paying attention thereto on a stereoscopic image;

detecting a parallax of the stereoscopic image and generating a parallax map indicating a parallax of each region of the stereoscopic image;

detecting a maximum value and a minimum value of parallaxes indicated by the parallax map and detecting a parallax of the attention region based on the parallax map and the attention region;

setting conversion characteristics for correcting a parallax of the stereoscopic image based on the attention region and the parallax max;

correcting the parallax map based on the conversion characteristics; and correcting a parallax of the stereoscopic image based on the corrected parallax map, wherein the conversion characteristics are set based also on the maximum value, the minimum value, and the parallax of the attention region.

7. A non-transitory computer-readable medium having embodied thereon a program, which when executed by a computer enables the computer to execute a method, the method comprising:

estimating an attention region which is estimated as a user paying attention thereto on a stereoscopic image;

detecting a parallax of the stereoscopic image and generating a parallax map indicating a parallax of each region of the stereoscopic image;

detecting a maximum value and a minimum value of parallaxes indicated by the parallax map and detecting a parallax of the attention region based on the parallax map and the attention region;

setting conversion characteristics for correcting a parallax of the stereoscopic image based on the attention region and the parallax map;

correcting the parallax map based on the conversion characteristics; and correcting a parallax of the stereoscopic image based on the corrected parallax map, wherein the conversion characteristics are set based also on the maximum value, the minimum value, and the parallax of the attention region.

8. An image processing apparatus comprising:

an attention region estimation unit that estimates an attention region which is estimated as a user paying attention thereto on a stereoscopic image;

a parallax detection unit that detects a parallax of the stereoscopic image and generates a parallax map indicating a parallax of each region of the stereoscopic image;

a maximum and minimum parallax detection unit that detects a maximum value and a minimum value of parallaxes indicated by the parallax map and detects a parallax of the attention region based on the parallax map and the attention region;

a histogram generation unit that generates a histogram of a parallax of the stereoscopic image indicated by the parallax map by weighting the parallax of the attention region;

a shift amount calculation unit that calculates a shift amount indicating a correction amount of the parallax of the stereoscopic image based on the histogram; and an image processing unit that corrects the parallax of the stereoscopic image by shifting at least one of a left eye image or a right eye image forming the stereoscopic image based on the shift amount, wherein the histogram generation unit generates the histogram based also on the maximum value and the minimum value, and wherein the attention region estimation unit, the parallax detection unit, the histogram generation unit, the shift amount calculation unit, and the image processing unit are each implemented via at least one processor.

9. An image processing method comprising:

estimating an attention region which is estimated as a user paying attention thereto on a stereoscopic image;

detecting a parallax of the stereoscopic image and generating a parallax map indicating a parallax of each region of the stereoscopic image;

detecting a maximum value and a minimum value of parallaxes indicated by the parallax map and detecting a parallax of the attention region based on the parallax map and the attention region;

generating a histogram of a parallax of the stereoscopic image indicated by the parallax map by weighting the parallax of the attention region;

calculating a shift amount indicating a correction amount of the parallax of the stereoscopic image based on the histogram; and correcting the parallax of the stereoscopic image by shifting at least one of a left eye image or a right eye image forming the stereoscopic image based on the shift amount, wherein the histogram is generated based also on the maximum value and the minimum value.

10. A non-transitory computer-readable medium having embodied thereon a program, which when executed by a computer enables the computer to execute a method, the method comprising:
  estimating an attention region which is estimated as a user paying attention thereto on a stereoscopic image;
  detecting a parallax of the stereoscopic image and generating a parallax map indicating a parallax of each region of the stereoscopic image;
  detecting a maximum value and a minimum value of parallaxes indicated by the parallax map and detecting a parallax of the attention region based on the parallax map and the attention region;
  generating a histogram of a parallax of the stereoscopic image indicated by the parallax map by weighting the parallax of the attention region;
  calculating a shift amount indicating a correction amount of the parallax of the stereoscopic image based on the histogram; and
  correcting the parallax of the stereoscopic image by shifting at least one of a left eye image or a right eye image forming the stereoscopic image based on the shift amount,
  wherein the histogram is generated based also on the maximum value and the minimum value.

11. An image processing apparatus comprising:
  a scene recognition unit that performs scene recognition for a stereoscopic image;
  a parallax detection unit that detects a parallax of the stereoscopic image and generates a parallax map indicating a parallax of each region of the stereoscopic image;
  a maximum and minimum parallax detection unit that detects a maximum value and a minimum value of parallaxes indicated by the parallax map;
  a setting unit that sets conversion characteristics for correcting a parallax of the stereoscopic image based on the parallax map;
  a parallax conversion unit that corrects the parallax map based on the conversion characteristics and a result of the scene recognition; and
  an image synthesis unit that corrects a parallax of the stereoscopic image based on the corrected parallax map,
  wherein the setting unit sets the conversion characteristics based also on the maximum value and the minimum value, and
  wherein the scene recognition unit, the parallax detection unit, the setting unit, and the parallax conversion unit are each implemented via at least one processor.

12. An image processing method comprising:
  performing scene recognition for a stereoscopic image;
  detecting a parallax of the stereoscopic image and generating a parallax map indicating a parallax of each region of the stereoscopic image;
  detecting a maximum value and a minimum value of parallaxes indicated by the parallax map;
  setting conversion characteristics for correcting a parallax of the stereoscopic image based on the parallax map;
  correcting the parallax map based on the conversion characteristics and a result of the scene recognition; and
  correcting a parallax of the stereoscopic image based on the corrected parallax map,
  wherein conversion characteristics are set based also on the maximum value and the minimum value.

13. A non-transitory computer-readable medium having embodied thereon a program, which when executed by a computer enables the computer to execute a method, the method comprising:
  performing scene recognition for a stereoscopic image;
  detecting a parallax of the stereoscopic image and generates a parallax map indicating a parallax of each region of the stereoscopic image;
  detecting a maximum value and a minimum value of parallaxes indicated by the parallax map;
  setting conversion characteristics for correcting a parallax of the stereoscopic image based on the parallax map;
  correcting the parallax map based on the conversion characteristics and a result of the scene recognition; and
  correcting a parallax of the stereoscopic image based on the corrected parallax map,
  wherein conversion characteristics are set based also on the maximum value and the minimum value.

* * * * *